United States Patent
Li et al.

(10) Patent No.: US 8,405,270 B2
(45) Date of Patent: Mar. 26, 2013

(54) PERMANENT MAGNET BURIED TYPE ELECTRIC MOTOR

(75) Inventors: Hu Li, Osaka (JP); Yuichi Yoshikawa, Osaka (JP); Hiroshi Murakami, Osaka (JP); Hiroki Sato, Fukui (JP)

(73) Assignee: Panasonic Corporation, Osaka (JP)

( * ) Notice: Subject to any disclaimer, the term of this patent is extended or adjusted under 35 U.S.C. 154(b) by 414 days.

(21) Appl. No.: 12/598,840

(22) PCT Filed: Mar. 21, 2008

(86) PCT No.: PCT/JP2008/000666
§ 371 (c)(1),
(2), (4) Date: Nov. 4, 2009

(87) PCT Pub. No.: WO2008/139675
PCT Pub. Date: Nov. 20, 2008

(65) Prior Publication Data
US 2011/0050022 A1    Mar. 3, 2011

(30) Foreign Application Priority Data

May 7, 2007   (JP) ................................. 2007-122071
May 7, 2007   (JP) ................................. 2007-122072

(51) Int. Cl.
*H02K 21/12* (2006.01)
(52) U.S. Cl. ................. 310/156.53; 310/156.46
(58) Field of Classification Search ............. 310/156.53, 310/156.46, 156.45
See application file for complete search history.

(56) References Cited

U.S. PATENT DOCUMENTS

| | | | |
|---|---|---|---|
| 6,759,776 B2 * | 7/2004 | Takahata et al. | 310/156.38 |
| 6,812,614 B2 * | 11/2004 | Yamamoto et al. | 310/261.1 |
| 6,844,652 B1 | 1/2005 | Chu et al. | |
| 6,919,663 B2 * | 7/2005 | Iles-Klumpner | 310/156.53 |
| 7,042,127 B2 * | 5/2006 | Tsuruta et al. | 310/156.53 |
| 7,474,027 B2 * | 1/2009 | Kikuchi et al. | 310/156.53 |
| 2002/0067096 A1 | 6/2002 | Yamamoto et al. | |
| 2004/0256940 A1 * | 12/2004 | Tsuruta et al. | 310/156.53 |

(Continued)

FOREIGN PATENT DOCUMENTS

| | | | |
|---|---|---|---|
| JP | 07-222384 A | | 8/1995 |
| JP | 09294344 | * | 11/1997 |

(Continued)

OTHER PUBLICATIONS

International Search Report for International Application No. PCT/JP2008/000666, dated Jun. 24, 2008, 2 pages.

*Primary Examiner* — Dang Le
(74) *Attorney, Agent, or Firm* — Brinks Hofer Gilson & Lione

(57) ABSTRACT

Supposing a straight line joining rotation center O of a rotor and a magnetic pole middle, that is, a middle of permanent magnets (25) to be a d-axis, and a straight line joining rotation center O and an intermediate point of mutually adjacent permanent magnets (25) to be a q-axis, mutually adjacent arcs A1 and A2 are composed such that radius R1 of arc A1 at the d-axis side is larger than radius R2 of arc A2 at the q-axis side, and that, at intersection point β of mutual arcs A1 and A2, angle α of tangent u of arc A2 at the q-axis side with respect to tangent t of arc A1 at the d-axis side is set by −3 degrees ≦ α ≦ 2 degrees.

20 Claims, 19 Drawing Sheets

U.S. PATENT DOCUMENTS

| | | | |
|---|---|---|---|
| 2005/0023923 A1 | 2/2005 | Chu et al. | |
| 2006/0017345 A1* | 1/2006 | Uchida et al. | 310/156.56 |
| 2006/0163967 A1* | 7/2006 | Yamamoto et al. | 310/216 |
| 2007/0222319 A1* | 9/2007 | Yoshikawa et al. | 310/156.53 |
| 2011/0050022 A1* | 3/2011 | Li et al. | 310/156.46 |

FOREIGN PATENT DOCUMENTS

| | | | |
|---|---|---|---|
| JP | 2000-197292 A | | 7/2000 |
| JP | 2002-010541 A | | 1/2002 |
| JP | 2002-084695 A | | 3/2002 |
| JP | 2004-260972 A | | 9/2004 |
| JP | 2005-051979 A | | 2/2005 |
| JP | 2006-238667 A | | 9/2006 |
| WO | 2004/064225 | * | 7/2004 |

* cited by examiner

US 8,405,270 B2

PERMANENT MAGNET BURIED TYPE ELECTRIC MOTOR

TECHNICAL FIELD

The present invention relates to a permanent magnet buried type electric motor including a stator having a winding wound on a stator core composed of teeth and a yoke, and a rotor rotatably held opposite to an inner circumference of the teeth, and having a rotor core with a permanent magnet buried in a magnet burying hole.

BACKGROUND ART

In this technical field, technologies disclosed in patent document 1 and patent document 2 are known.

In the invention disclosed in patent document 1, permanent magnet burying holes are provided at equal intervals for the number of magnetic poles in a rotor in the circumferential direction of a rotor core. In each permanent magnet burying hole, a permanent magnet is held, and each permanent magnet is disposed so that the magnetic pole surface different from an adjacent permanent magnet may form a magnetic pole part directed to the outer circumferential direction of the iron core. The outer circumferential curved surface of the rotor core opposite to each magnetic pole part is formed in an arc largest in the distance from a rotation center in the middle of the magnetic poles, and smallest in the distance from a rotation center between the magnetic poles.

FIG. 21 is a sectional view of a conventional permanent magnet buried type electric motor disclosed in patent document 2, and FIG. 22 is a partially magnified view of its rotor. The conventional configuration shown in these drawings is explained.

In the invention of patent document 2, as shown in FIG. 21 and FIG. 22, the outer circumferential portion of one pole of a permanent magnet of rotor 91 in which permanent magnet 95 is accommodated is composed of first outer circumferential portion P1 and second outer circumferential portion P2. First outer circumferential portion P1 intersects with a line (a d-axis) passing through center O of rotor 91 and the magnetic pole central part, and is formed in an arc shape of radius R centered on center O of rotor 91. Second outer circumferential portion P2 intersects with a line (a q-axis) passing through center O of rotor 91 and between the magnetic poles, and is formed in an arc shape of radius Rq centered on point Q positioned on the q-axis. The relation of R<Rq is established. Herein, first outer circumferential portion P1 and second outer circumferential portion P2 cross at intersection point γ. Thus, patent document 2 discloses the rotor having an outer circumferential shape composed of a plurality of arcs different in radius.

In the invention of patent document 1, however, the outer circumferential shape of the rotor corresponding to one magnetic pole is formed of a single arc. The magnetic flux is saturated in a portion (bridge portion) of a minimum distance between the magnet end part and the rotor outer circumference, and the magnetic flux supposed to flow into the bridge portion consequently flows into a portion of a larger distance between the magnet end part and the rotor outer circumference. It was hence difficult to adjust the direction of the magnetic flux in the arc portion, and also difficult to adjust the magnetic flux density distribution in the air gap part in a sinusoidal wave shape.

In the invention of patent document 2, the intersection point of second outer circumferential portion P2 and q-axis, center O of first outer circumferential portion P1, and center Q of second outer circumferential portion P2 are determined to be positioned on a same straight line. Hence, at intersection point γ between first outer circumferential portion P1 and second outer circumferential portion P2, a concave shape is formed. Therefore in the invention of patent document 2, the outer circumferential curved surface of the rotor core is not a curved surface changing smoothly near intersection point γ, and it was difficult to form the magnetic flux density distribution in the air gap part in a sinusoidal wave shape.

Patent document 1: Japanese Patent Unexamined Publication No. 2000-197292
Patent document 2: Japanese Patent Unexamined Publication No. 2004-260972

SUMMARY OF THE INVENTION

The permanent magnet buried type electric motor of the present invention has the following configuration.

That is, it includes a stator having a winding wound on a stator core having a plurality of teeth at the inner circumferential side of a yoke, and a rotor rotatably held opposite to the teeth, and having a rotor core. The rotor core has a plurality of magnet burying holes in which permanent magnets are buried for forming magnetic poles, and has an outer circumferential shape composed of a plurality of arcs different in radius. Supposing a straight line joining a rotation center of the rotor and a magnetic pole middle, that is, a middle of the permanent magnets to be a d-axis, and a straight line joining the rotation center and an intermediate point of mutually adjacent permanent magnets to be a q-axis, the mutually adjacent arcs are composed such that the radius of the arc at the d-axis side is larger than the radius of the arc at the q-axis side, and that, at an intersection point of the mutual arcs, angle α of a tangent of the arc at the q-axis side with respect to a tangent of the arc at the d-axis side is set by $-3 \text{ degrees} \leq \alpha \leq 2 \text{ degrees}$.

In this configuration, near the intersection point of mutually adjacent arcs, a curvature of the outer circumferential curved surface of the rotor core changes smoothly, and a magnetic flux density distribution of the air gap part may be approximate to a sinusoidal wave shape.

In particular, when angle α is 0 degree, the mutually adjacent arcs are set in a relation such that the intersection point of the mutual arcs, a center of the arc at the d-axis side, and a center of the arc at the q-axis side are formed on a same straight line. Since the radius of the arc at the d-axis side is larger than the radius of the arc at the q-axis side, the curvature of the outer circumferential curved surface of the rotor core can be ideally changed smoothly, and the magnetic flux density distribution of the air gap part may be approximate to an ideal sinusoidal wave shape.

DESCRIPTION OF REFERENCE MARKS

Figure 1:
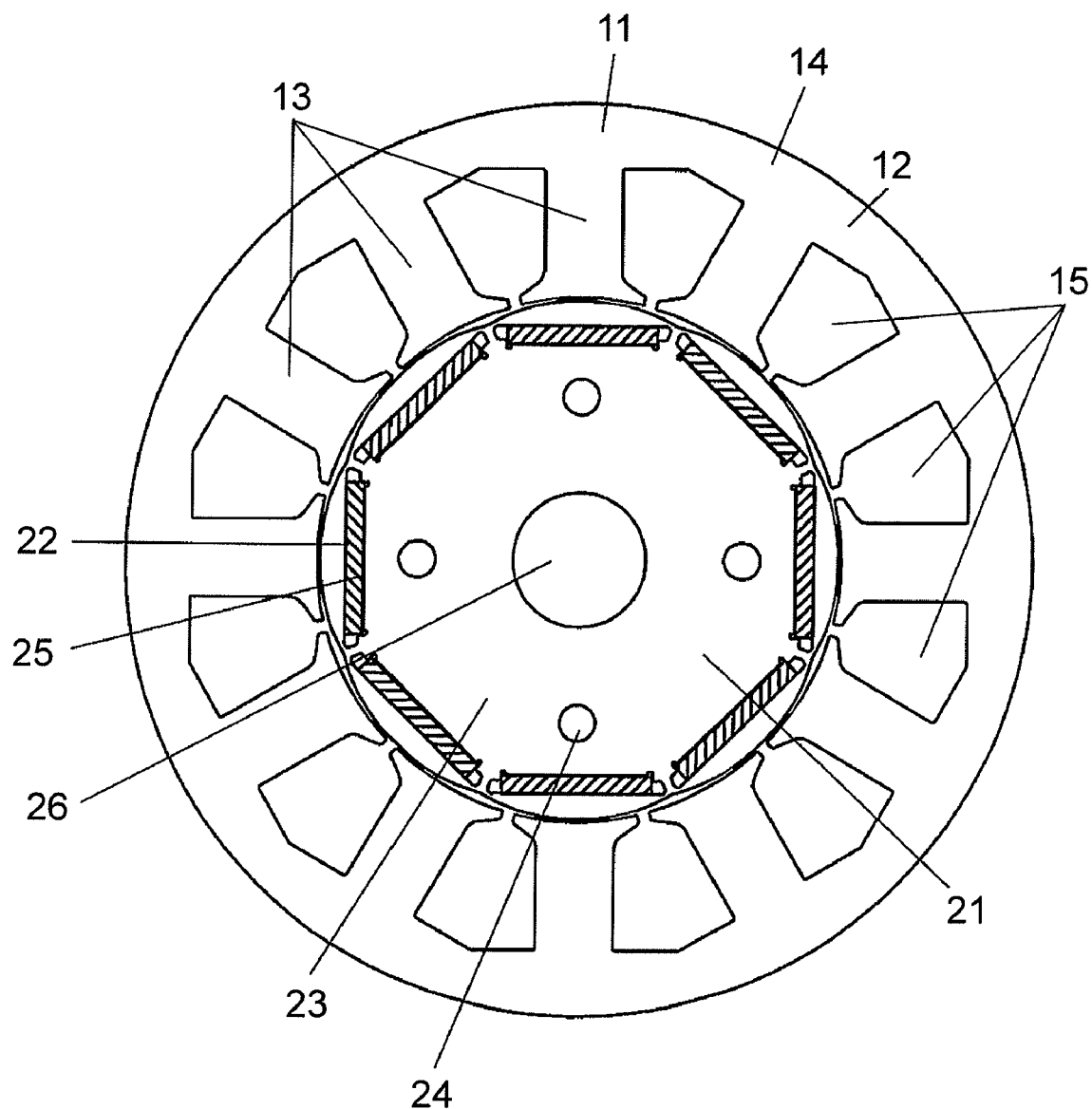
FIG. 1 is a sectional view of a permanent magnet buried type electric motor in preferred embodiment 1 of the present invention.

11 Stator
12 Yoke
13 Teeth
14 Stator core
15 Slot
21, 91 Rotor
22 Magnet burying hole
23, 230, 240, 250 Rotor core
24 Crimping pin
25, 95 Permanent magnet
26 Rotating shaft

PREFERRED EMBODIMENTS FOR CARRYING OUT THE INVENTION

Preferred embodiments of the present invention are specifically described below while referring to the accompanying drawings.

Preferred Embodiment 1

FIG. 1 is a sectional view of a permanent magnet buried type electric motor (or called an electric motor) in preferred embodiment 1 of the present invention.

The electric motor in preferred embodiment 1 has a configuration consisting of stator 11 and rotor 21.

Stator 11 includes stator core 14 laminated a plurality of high-permeability thin iron plates by pressing and blanking, and a winding (not shown) wound on stator core 14. This stator core 14 has yoke 12, a plurality of teeth 13 formed at the inner circumferential side of yoke 12, and slots 15 formed between adjacent teeth 13. A winding is wound on this stator core 14 by concentrated winding, and is accommodated in slots 15.

On the other hand, rotor 21 includes rotor core 23 forming a plurality of magnet burying holes 22, permanent magnets 25 to be buried in individual magnet burying holes 22, and end plates (not shown) disposed at both end parts in the axial direction. Rotor core 23 is formed by laminating a plurality of high-permeability thin iron plates having magnet burying holes 22 in the axial direction. To form magnetic poles in rotor 21, permanent magnets 25 are accommodated and held in individual magnet burying holes 22. The end plates and rotor core 23 are tightened by crimping pins 24. Rotating shaft 26 is tightened in the center of rotor core 23, and rotor core 23 is rotatably supported by a bearing (not shown).

Rotor 21 having such configuration is set opposite to the inner circumference of teeth 13 of stator 11 by way of an air gap.

In FIG. 1, rotor 21 has eight magnetic poles (four pole pairs), and the number of slots of stator 11 is twelve, but the present invention is not limited to this combination alone, but may be applied to other combinations.

Figure 2:
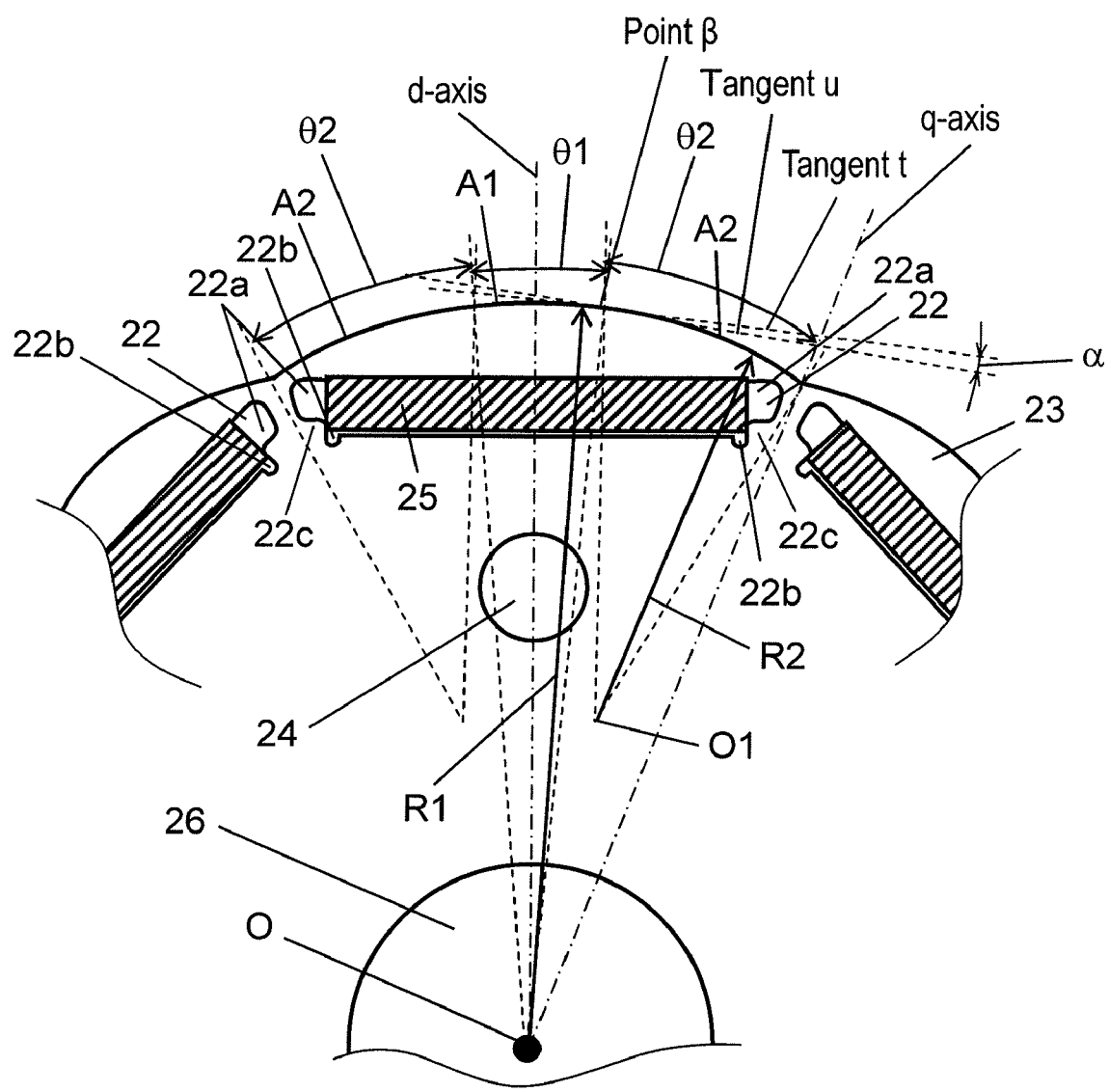
FIG. 2 is a partially magnified view of the outer circumference corresponding to one magnetic pole in a rotor of the same electric motor.

FIG. 2 is a partially magnified view of the outer circumference corresponding to one magnetic pole in rotor 21 of FIG. 1, that is, one permanent magnet 25.

In FIG. 2, magnet burying hole 22 has rectangular hole 22a slightly larger than the section of permanent magnet 25 to be inserted, and protrusion 22b provided at the side of rotating shaft 26 in the shorter side direction, near both ends of the longer side direction. In rectangular hole 22a, recess 22c is formed at the side of rotating shaft 26 of the shorter side direction. By this recess 22c, it is effective to prevent deviation of permanent magnet 25 in the longitudinal direction within rectangular hole 22a. The length of protrusion 22b in the radial direction of rotor 21 is smaller than the length in the radial direction of the rotor in rectangular hole 22a (that is, the shorter side length). It is hence possible to prevent decline of magnetic flux density between rotor 21 and stator 11 due to shifting of permanent magnet 25 to the side of rotating shaft 26. Since permanent magnet 25 is positioned at the boundary position of rectangular hole 22a, protrusion 22b, and recess 22c, it is not necessary to fix permanent magnet 25 by using an adhesive. This protrusion 22b is a cavity functioning also as an adhesive sump, and can prevent short-circuiting of magnetic flux of adjacent permanent magnets 25.

The shape of rotor core 23 is explained. As shown in FIG. 2, a straight line joining rotation center O of rotor 21 and the magnetic pole middle in the middle of permanent magnets 25 is supposed to be a d-axis. A straight line joining rotation center O of rotor 21 and between the magnetic poles at the intermediate point of mutually adjacent permanent magnets 25 is supposed to be a q-axis.

The outer circumferential shape of rotor core 23 corresponding to one magnetic pole is composed of two arcs A1, A2 having different radii R1, R2. Rotor core 23 of this electric motor has an outer circumferential shape consisting of a plurality of arcs different in radius. In this preferred embodiment 1, arc A1 and arc A2 are adjacent to each other, and the d-axis side arc is arc A1, and the q-axis side arc is arc A2.

Arc A1 positioned at the intersection point of the d-axis and the outer circumference of rotor core 23 is formed at radius R1 centered on rotation center O. Arc A2 adjacent to arc A1 is formed at radius R2 centered on center O1. With respect to tangent t of arc A1 at intersection point β of arc A1 and arc A2, angle α [degrees] of tangent u of arc A2 at intersection point β is set at −3 degrees or more to 2 degrees or less. That is, at mutual intersection point β of arc A1 and arc A2, angle α of tangent u of arc A2 at the q-axis side with respect to tangent t of arc A1 at the d-axis side is set at $-3$ degrees$\leq\alpha\leq2$ degrees.

From such relation of tangent t and tangent u, before and after intersection point β in the circumferential direction, a curve smooth in arc A1 and arc A2 can be drawn.

Herein, radius R1 of arc A1 and radius R2 of arc A2 are in a relation of R1>R2. That is, radius R1 of arc A1 at the d-axis side is larger than radius R2 of arc A2 at the q-axis side. In particular, R2/R1 or the ratio of radius R2 over radius R1 is preferred to be $0.5\leq R2/R1\leq0.9$, that is, 0.5 or more to 0.9 or less.

Arc A1 is formed in a range of angle θ1 [degrees] at mechanical angle to both sides of the d-axis from rotation center O. Herein, the relation of angle θ1 [degrees] and number of pole pairs P is preferably 12 degrees/$P\leq\theta1\leq90$ degrees/P. In this preferred embodiment 1, since the number of pole pairs P is 4, the value of angle θ1 is preferred to be in a range of 3 degrees$\leq\theta1\leq22.5$ degrees.

The reason of setting angle α [degrees] of tangent u with respect to tangent t at −3 degrees or more to 2 degrees or less is explained below while referring to FIG. 3 and FIG. 4.

Figure 3:
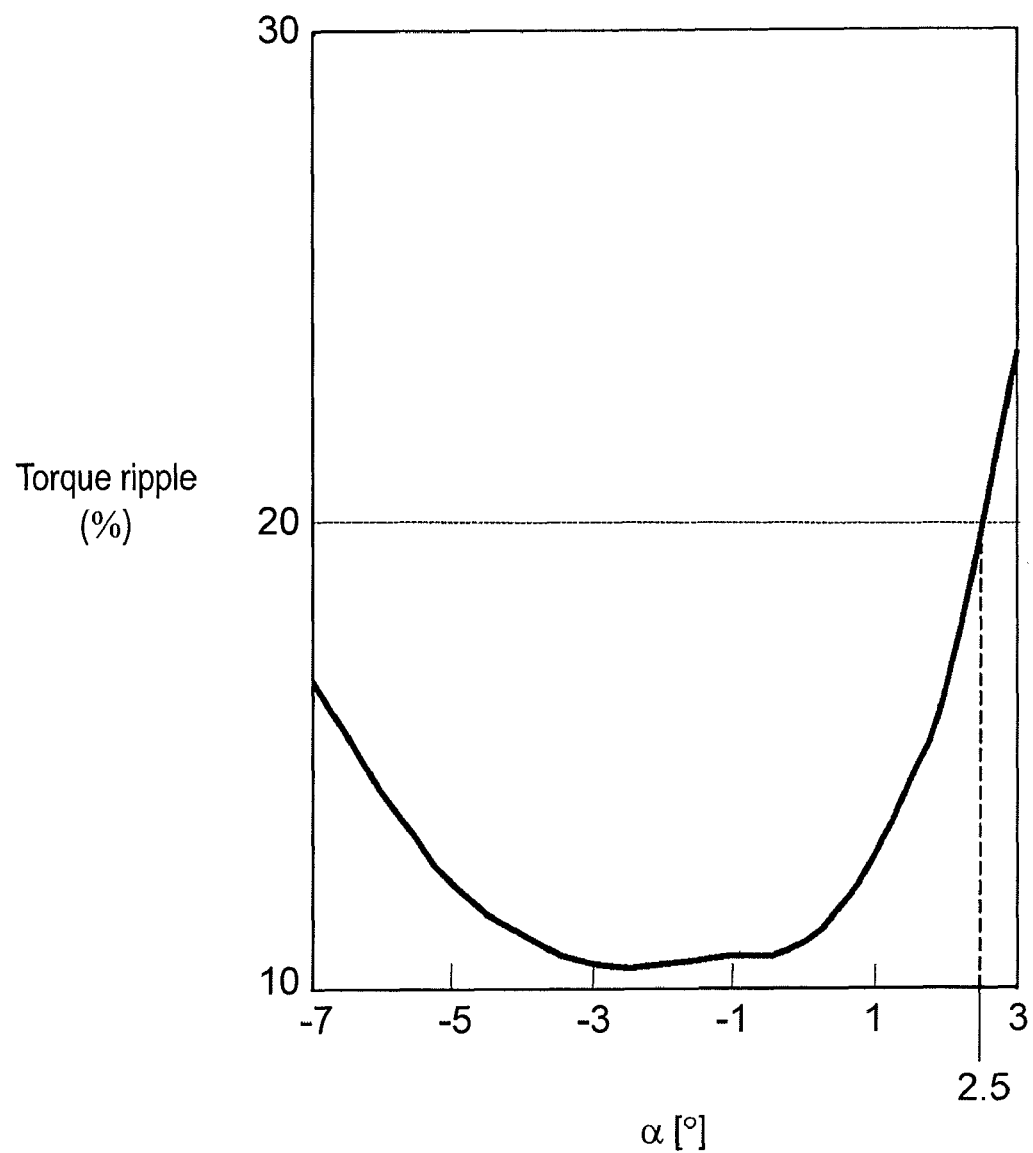
FIG. 3 is a diagram showing the relation of angle α and torque ripple of the same electric motor.

FIG. 3 is a diagram showing the relation of angle α and torque ripple of the electric motor in preferred embodiment 1 of the present invention. It is known from FIG. 3 that the torque ripple is minimum at the value of angle α in a range of −3 degrees to −2 degrees. From the boundary of this minimum point, as the value of angle α decreases, the value of the torque ripple becomes larger, and as the value of angle α increases, the value of the torque ripple becomes larger.

Generally, when the value of the torque ripple is 20% or less, it is known effective for low vibration and low noise. In this preferred embodiment 1, therefore, the value of angle α is preferred to be in a range of −7 degrees$\leq\alpha\leq2.5$ degrees where the torque ripple is 20% or less, in particular, because the vibration is low and the noise is low.

Figure 4:
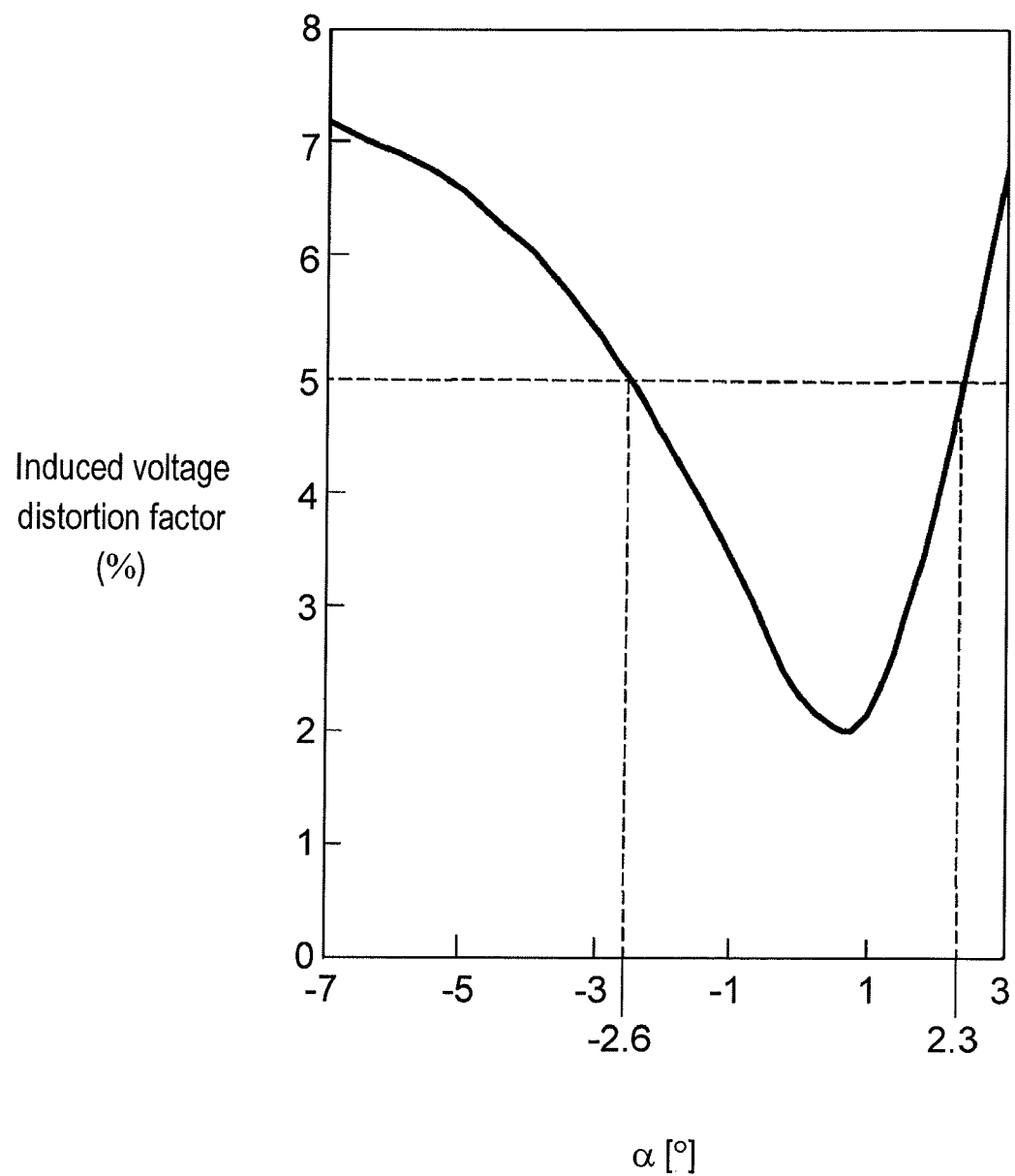
FIG. 4 is a diagram showing the relation of angle α and induced voltage distortion factor of the same electric motor.

FIG. 4 is a diagram showing the relation of angle α and induced voltage distortion factor of the electric motor in preferred embodiment 1 of the present invention. It is known from FIG. 4 that the induced voltage distortion factor is minimum at the value of angle α in a range of 0 degree to about 1 degree. From the boundary of this minimum point, as the value of angle α decreases, the value of the induced voltage distortion factor becomes larger, and as the value of angle α increases, the value of the induced voltage distortion factor becomes larger.

Generally, when the value of the induced voltage distortion factor is 5% or less, it is known effective for low vibration and low noise. In this preferred embodiment 1, therefore, the value of angle α is preferred to be in a range of −2.6 degrees$\leq\alpha\leq2.3$ degrees where the induced voltage distortion factor is 5% or less, in particular, because the vibration is low and the noise is low.

Accordingly, the value of angle α is preferred to be in a range of −2.6 degrees$\leq\alpha\leq2.3$ degrees where the value of the torque ripple is 20% or less and the value of the induced voltage distortion factor is 5% or less, in particular, because the vibration is low and the noise is low.

Next, the reason of setting the value of angle θ1 [degrees] and number of pole pairs P in a relation of 12 degrees/$P\leq\theta1\leq90$ degrees/P is explained below while referring to FIG. 5 and FIG. 6.

Figure 5:
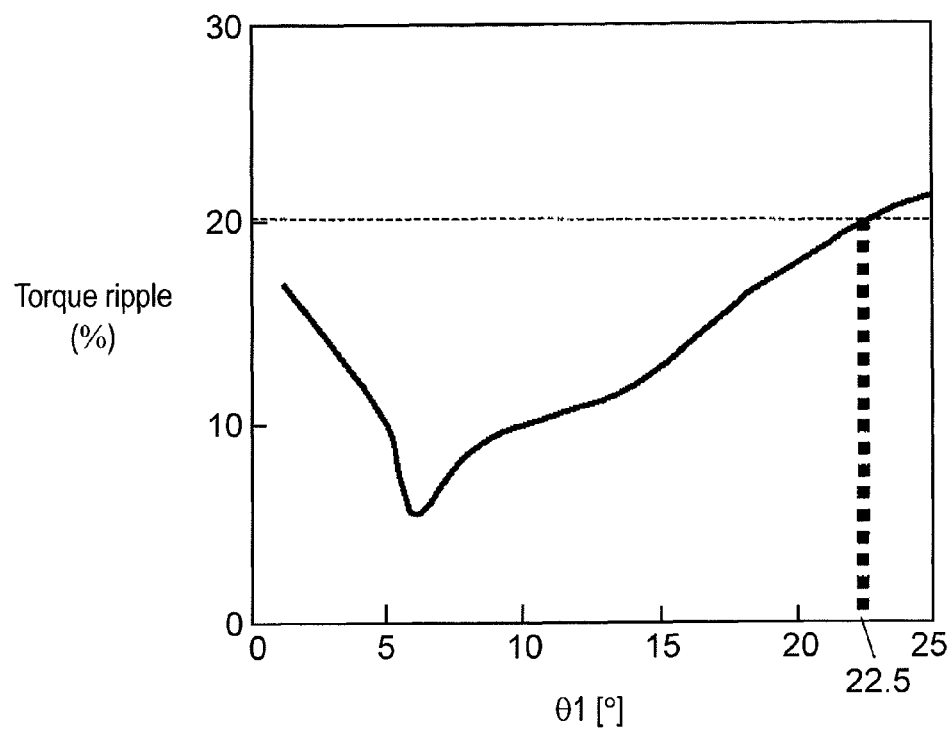
FIG. 5 is a diagram showing the relation of angle θ1 and torque ripple of the same electric motor.

FIG. 5 is a diagram showing the relation of angle θ1 and torque ripple of the electric motor in preferred embodiment 1 of the present invention. It is known from FIG. 5 that the torque ripple is minimum at the value of angle θ1 in a range of 5 degrees to about 6 degrees. From the boundary of this minimum point, as the value of angle θ1 decreases, the value of the torque ripple becomes larger, and as the value of angle θ1 increases, the value of the torque ripple becomes larger.

Generally, as mentioned above, when the value of the torque ripple is 20% or less, it is known effective for low vibration and low noise. In this preferred embodiment 1, therefore, the value of angle θ1 is preferred to be $\theta1\leq22.5$ degrees where the torque ripple is 20% or less, in particular, because the vibration is low and the noise is low.

Figure 6:
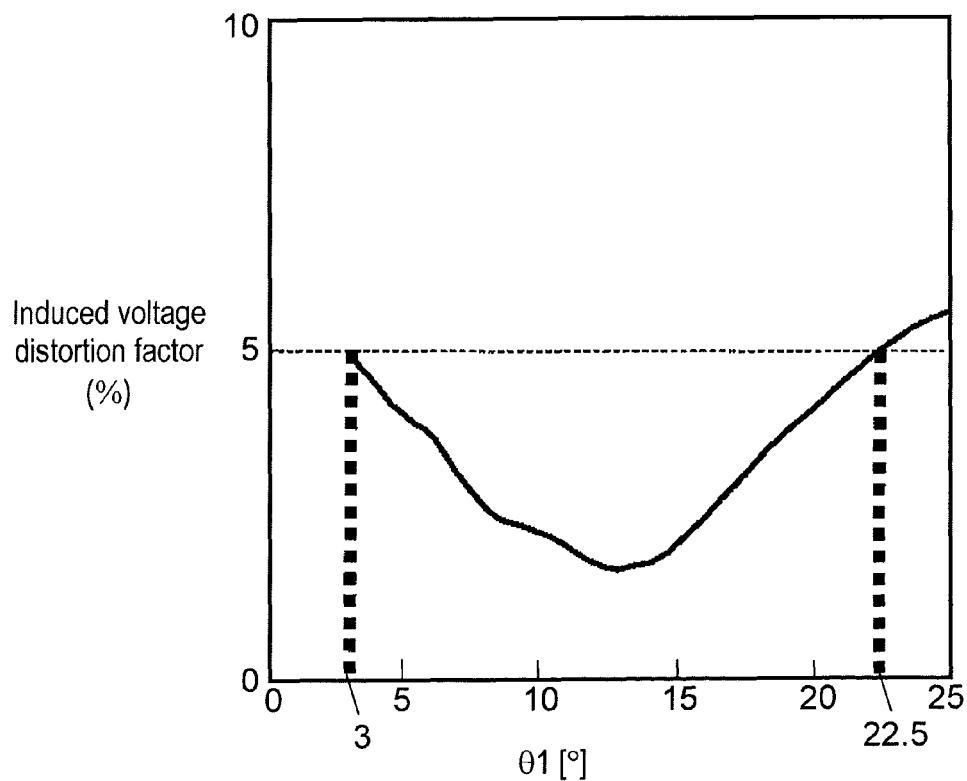
FIG. 6 is a diagram showing the relation of angle θ1 and induced voltage distortion factor of the same electric motor.

FIG. 6 is a diagram showing the relation of angle θ1 and induced voltage distortion factor of the electric motor in preferred embodiment 1 of the present invention. It is known from FIG. 6 that it is minimum at the value of angle θ1 in a range of 13 degrees to about 14 degrees. From the boundary of this minimum point, as the value of angle θ1 decreases, the value of the induced voltage distortion factor becomes larger, and as the value of angle θ1 increases, the value of the induced voltage distortion factor becomes larger.

Generally, as mentioned above, when the value of the induced voltage distortion factor is 5% or less, it is known effective for low vibration and low noise. In this preferred embodiment 1, therefore, the value of angle θ1 is preferred to be in a range of 3 degrees$\leq\theta1\leq22.5$ degrees where the induced voltage distortion factor is 5% or less, in particular, because the vibration is low and the noise is low.

Accordingly, the value of angle θ1 is preferred to be in a range of 3 degrees$\leq\theta1\leq22.5$ degrees where the value of the torque ripple is 20% or less and the value of the induced voltage distortion factor is 5% or less, in particular, because the vibration is low and the noise is low.

Meanwhile, angle θ1 is inversely proportional to the number of pole pairs P. Considering the relation with the number of pole pairs P of the present time, that is, the number of pole pairs of 4, the following relation is established, (3 degrees×4)/$P\leq\theta1\leq(22.5$ degrees×4)/P, that is, 12 degrees/$P\leq\theta1\leq90$ degrees/P.

The reason of setting R2/R1 or the ratio of radius R2 of arc A2 to radius R1 of arc A1 in the relation of $0.5\leq R2/R1\leq0.9$ is explained below while referring to FIG. 7 and FIG. 8.

Figure 7:
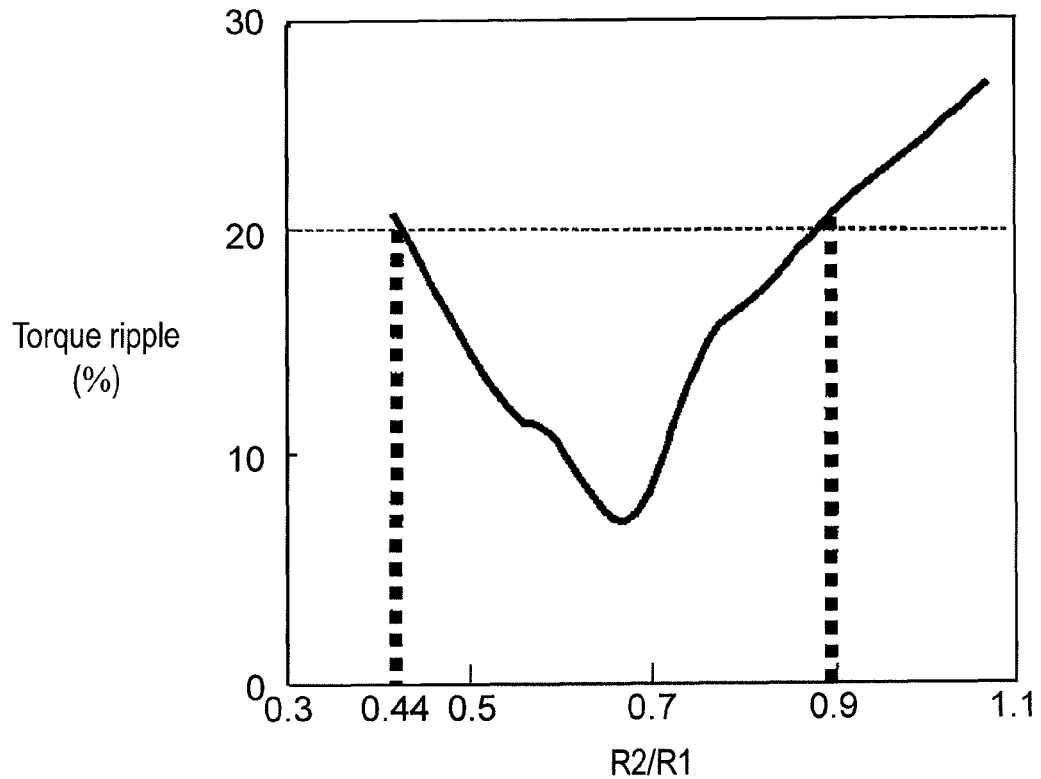
FIG. 7 is a diagram showing the relation of R2/R1 and torque ripple of the same electric motor.

FIG. 7 is a diagram showing the relation of R2/R1 and torque ripple of the electric motor in preferred embodiment 1 of the present invention. It is known from FIG. 7 that the torque ripple is minimum at the value of R2/R1 in a range of 0.6 to about 0.7. From the boundary of this minimum point, as the value of R2/R1 decreases, the value of the torque ripple becomes larger, and as the value of R2/R1 increases, the value of the torque ripple becomes larger.

Generally, as mentioned above, when the value of the torque ripple is 20% or less, it is known effective for low vibration and low noise. In this preferred embodiment 1, therefore, the value of R2/R1 is preferred to be $0.44 \leq R2/R1 \leq 0.9$ where the torque ripple is 20% or less, in particular, because the vibration is low and the noise is low.

Figure 8:
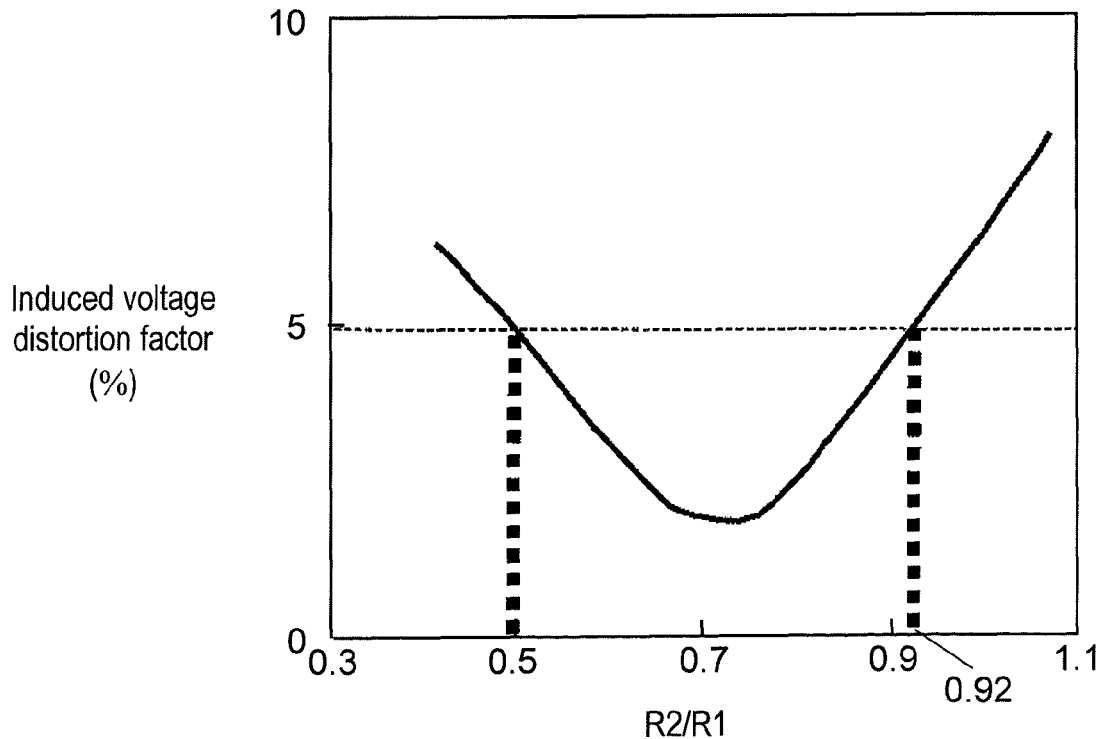
FIG. 8 is a diagram showing the relation of R2/R1 and induced voltage distortion factor of the same electric motor.

FIG. 8 is a diagram showing the relation of R2/R1 and induced voltage distortion factor of the electric motor in preferred embodiment 1 of the present invention. It is known from FIG. 8 that the induced voltage distortion factor is minimum at the value of R2/R1 in a range of 0.7 to about 0.8. From the boundary of this minimum point, as the value of R2/R1 decreases, the value of the induced voltage distortion factor becomes larger, and as the value of R2/R1 increases, the value of the induced voltage distortion factor becomes larger.

Generally, as mentioned above, when the value of the induced voltage distortion factor is 5% or less, it is known effective for low vibration and low noise. In this preferred embodiment 1, therefore, the value of R2/R1 is preferred to be in a range of $0.5 \leq R2/R1 \leq 0.92$ where the induced voltage distortion factor is 5% or less, in particular, because the vibration is low and the noise is low.

Accordingly, the value of R2/R1 is preferred to be in a range of $0.5 \leq R2/R1 \leq 0.9$ where the value of the torque ripple is 20% or less and the value of the induced voltage distortion factor is 5% or less, in particular, because the vibration is low and the noise is low.

Figure 21:
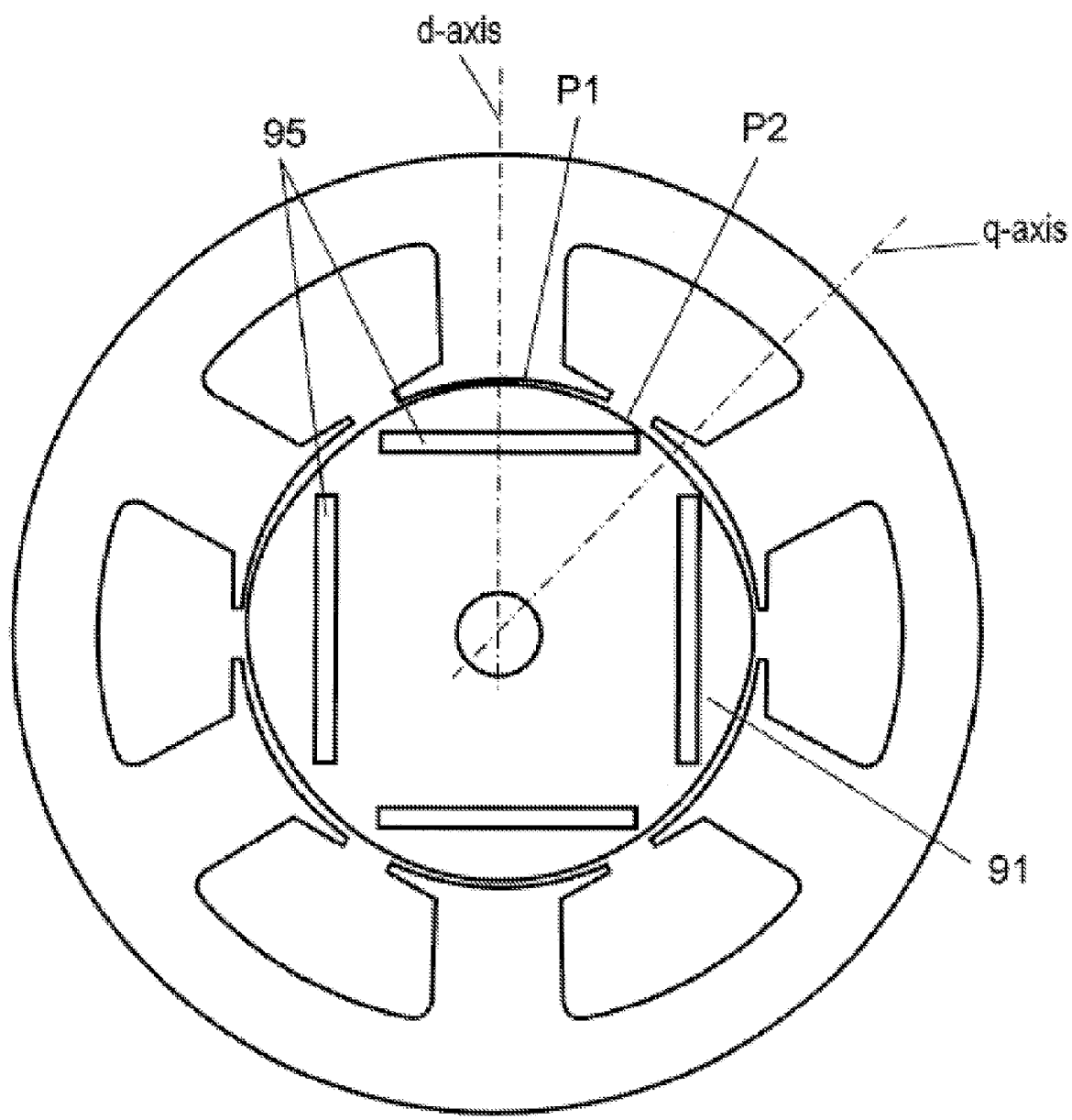
FIG. 21 is a sectional view of a conventional permanent magnet buried type electric motor.
Figure 22:
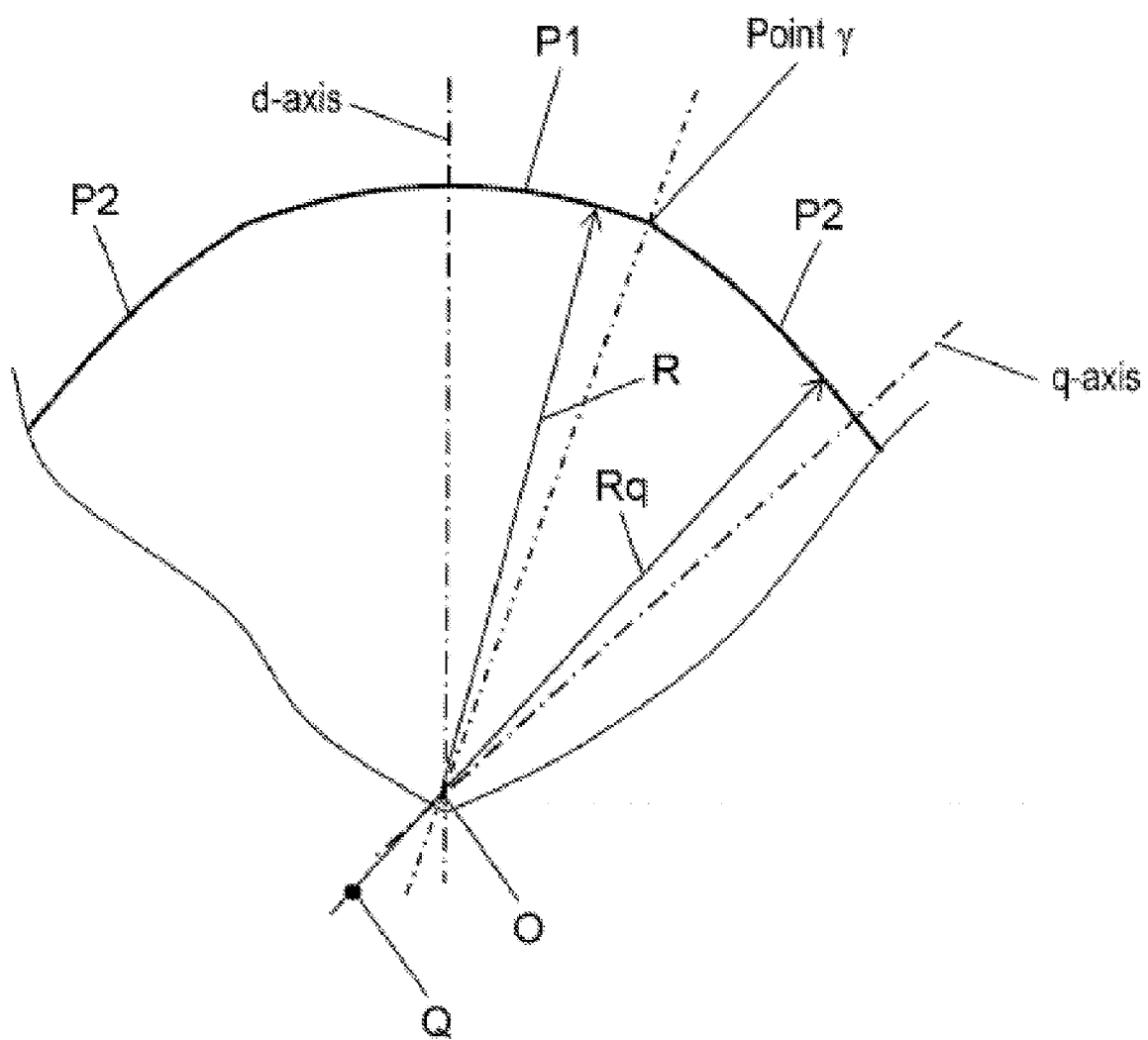
FIG. 22 is a partially magnified view of a section of a rotor of the same electric motor.

Referring next to FIG. 9 to FIG. 16, the electric motor of this preferred embodiment 1, and the electric motor of the prior art shown in FIG. 21 and FIG. 22 are compared, and the effects of the present invention are explained.

Figure 9:
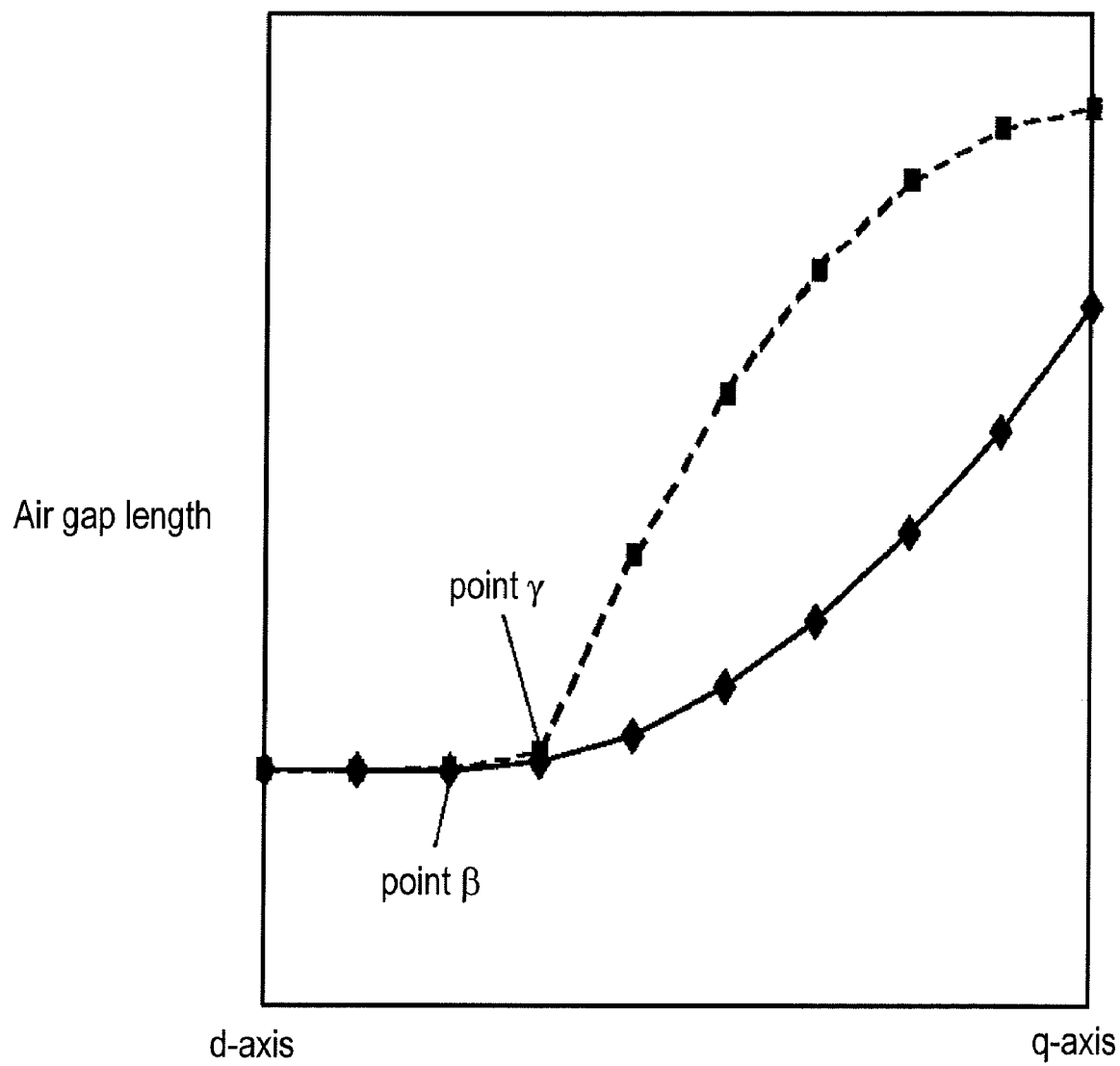
FIG. 9 is a comparative diagram of a length of an air gap part between a stator and a rotor, between preferred embodiment 1 and a prior art.

FIG. 9 compares the length of the air gap part between the stator and the rotor between this preferred embodiment 1 and the prior art, in which this preferred embodiment 1 is shown in solid line, and the prior art is shown in dotted line.

In the conventional configuration shown in FIG. 21 and FIG. 22, the intersection point of second outer circumferential portion P2 and q-axis, center O of first outer circumferential portion P1, and center Q of second outer circumferential portion P2 are set to be positioned on a same straight line. Accordingly, from the boundary of intersection point γ between first outer circumferential portion P1 and second outer circumferential portion P2, the curvature changes abruptly. That is, at intersection point γ, the angle of tangent of second outer circumferential portion P2 to tangent of first outer circumferential portion P1 becomes larger. As a result, as shown in FIG. 9, the change of air gap length of first outer circumferential portion P1 and the change of air gap length of second outer circumferential portion P2 are changed abruptly from the boundary of intersection point γ.

On the other hand, in the configuration of the electric motor of this preferred embodiment 1, angle α of tangent u of arc A2 at intersection point β to tangent t of arc A1 at intersection point β is set at −3 degrees or more to 2 degrees or less. Accordingly, before and after intersection point β, the curvature changes smoothly. Hence, as shown in FIG. 9, the change of air gap length of arc A1 and the change of air gap length of arc A2 are changed smoothly before and after intersection point β.

Figure 10A:
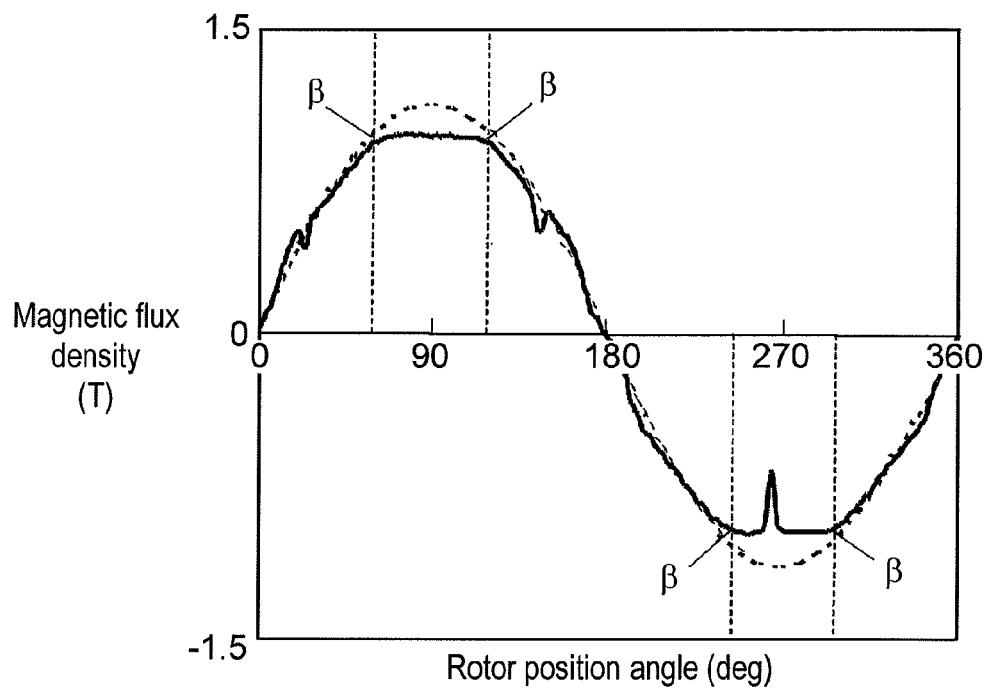
FIG. 10A is a diagram showing the relation of rotor position angle and magnetic flux density of air gap part of the electric motor of preferred embodiment 1 of the present invention.
Figure 10B:
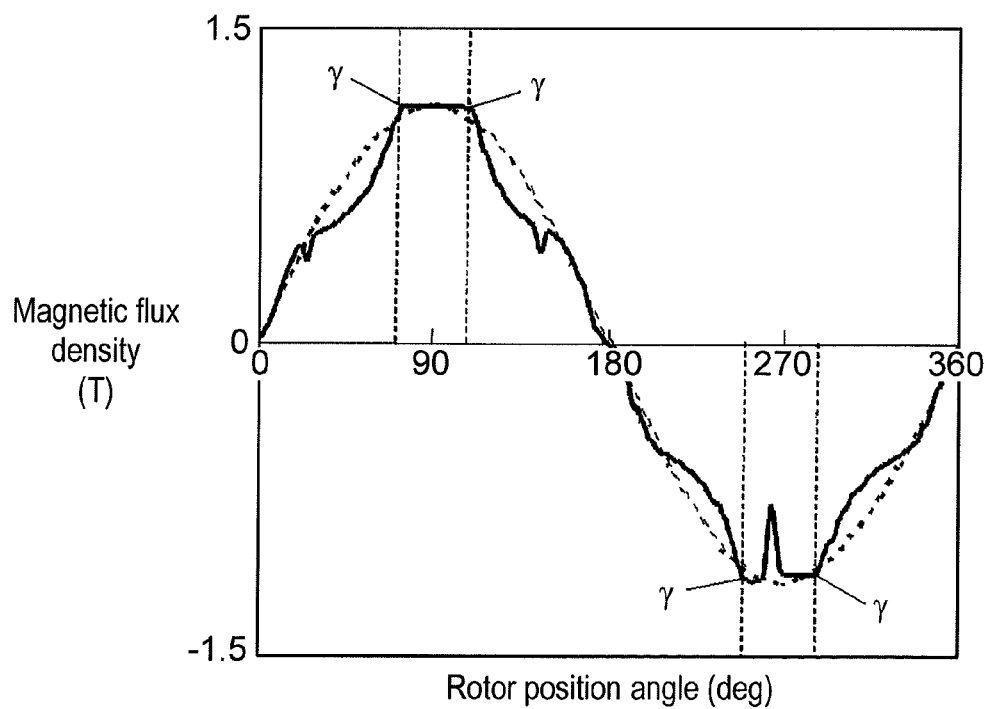
FIG. 10B is a diagram showing the relation of rotor position angle and magnetic flux density of air gap part of the electric motor in a prior art.

FIG. 10A and FIG. 10B are diagrams showing the relation of rotor position angle and magnetic flux density of air gap part, FIG. 10A showing this preferred embodiment 1 and FIG. 10B showing the prior art. In FIG. 10A and FIG. 10B, the dotted line indicates an ideal sinusoidal wave shape.

The electric motor of the prior art is largely deviated from the ideal sinusoidal wave shape before and after intersection point γ as shown in FIG. 10B. By contrast, the electric motor of this preferred embodiment 1 less deviated from the ideal sinusoidal wave shape before and after intersection point β as shown in FIG. 10A. Hence, as compared with the electric motor of the prior art, the electric motor of this preferred embodiment 1 is more approximate to the ideal sinusoidal wave shape in the magnetic flux density distribution of the air gap part.

Figure 11A:
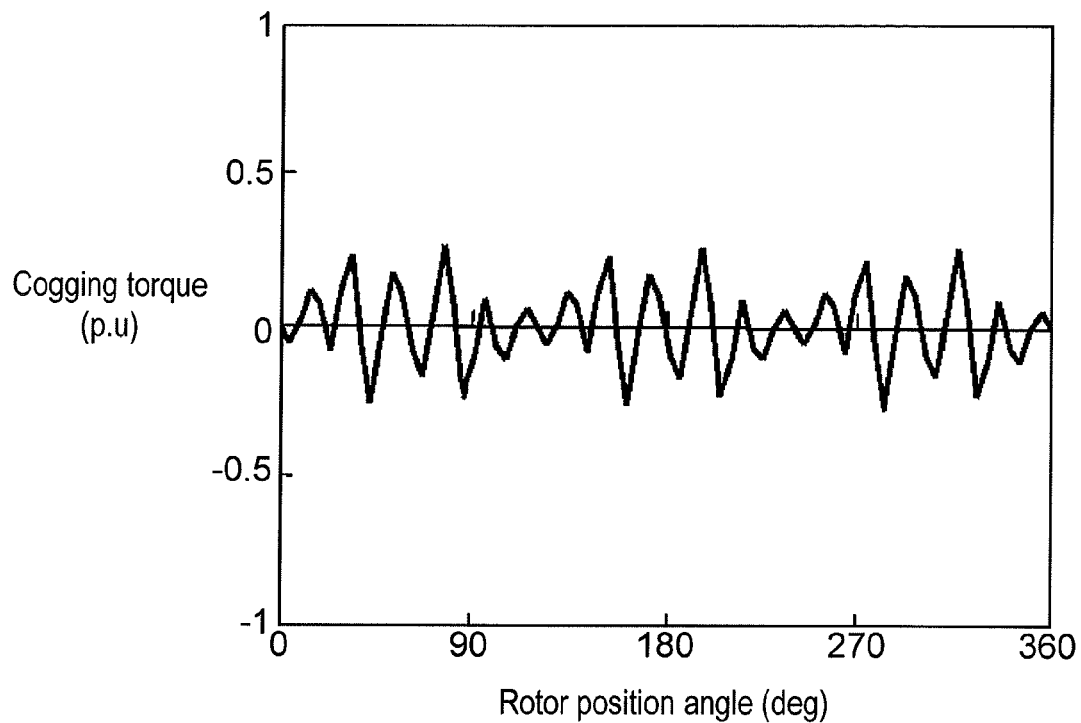
FIG. 11A is a diagram showing the relation of rotor position angle and cogging torque of the electric motor of preferred embodiment 1 of the present invention.
Figure 11B:
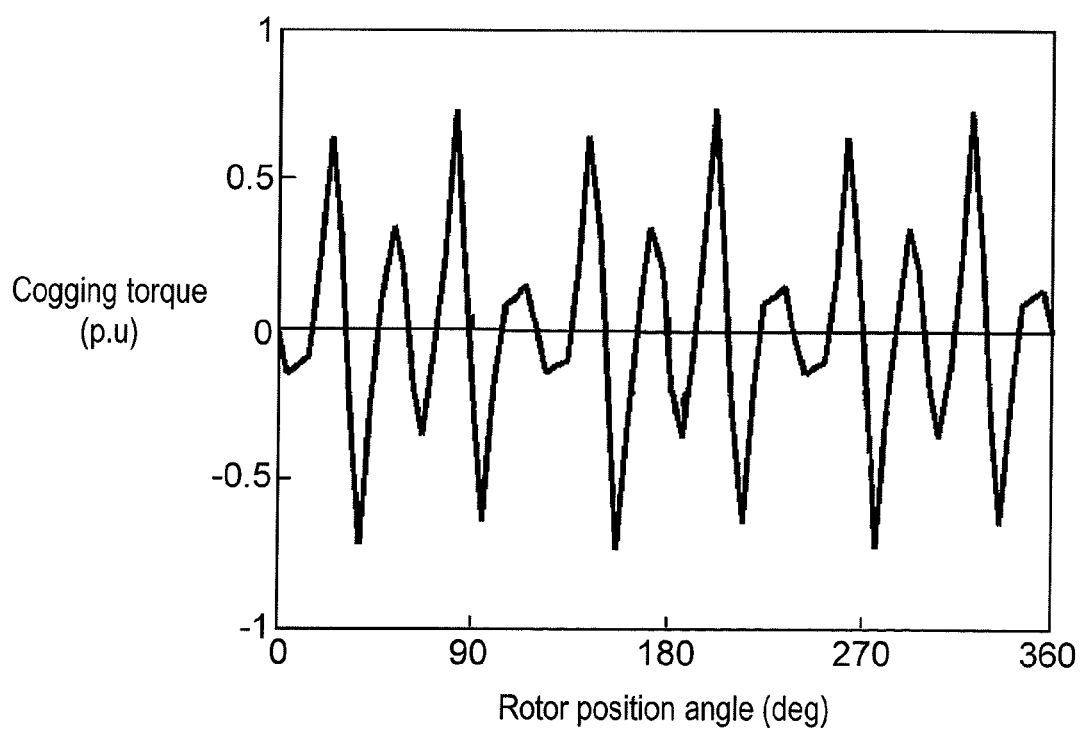
FIG. 11B is a diagram showing the relation of rotor position angle and cogging torque of the electric motor in a prior art.

FIG. 11A and FIG. 11B are diagrams showing the relation of rotor position angle and cogging torque, FIG. 11A showing this preferred embodiment 1 and FIG. 11B showing the prior art. Herein, the cogging torque is a value obtained by differentiating the squared value of magnetic flux density.

In the electric motor of the prior art, the magnetic flux density distribution is largely deviated from the sinusoidal wave shape, and hence the fluctuation of the cogging torque is significant as shown in FIG. 11B. By contrast, in the electric motor of this preferred embodiment 1, the magnetic flux density distribution is less deviated from the sinusoidal wave shape, and hence the fluctuation of the cogging torque is small as shown in FIG. 11A. Hence, as compared with the electric motor of the prior art, the electric motor of this preferred embodiment 1 is smaller in the fluctuation of the cogging torque.

Figure 12A:
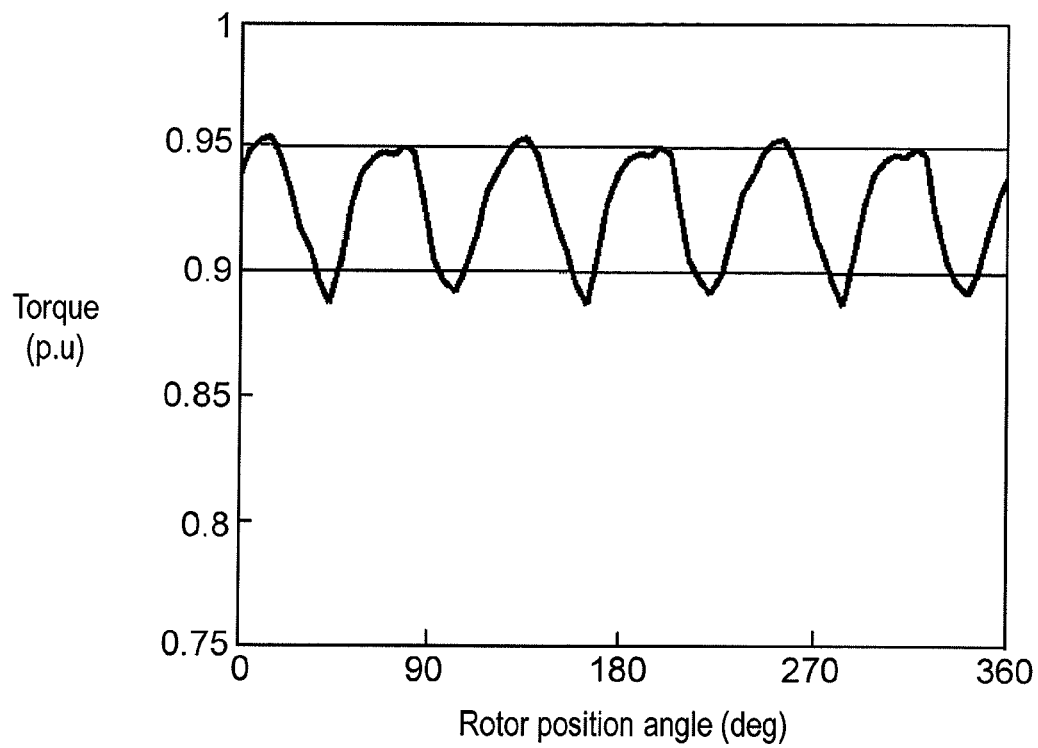
FIG. 12A is a diagram showing the relation of rotor position angle and torque of the electric motor of preferred embodiment 1 of the present invention.
Figure 12B:
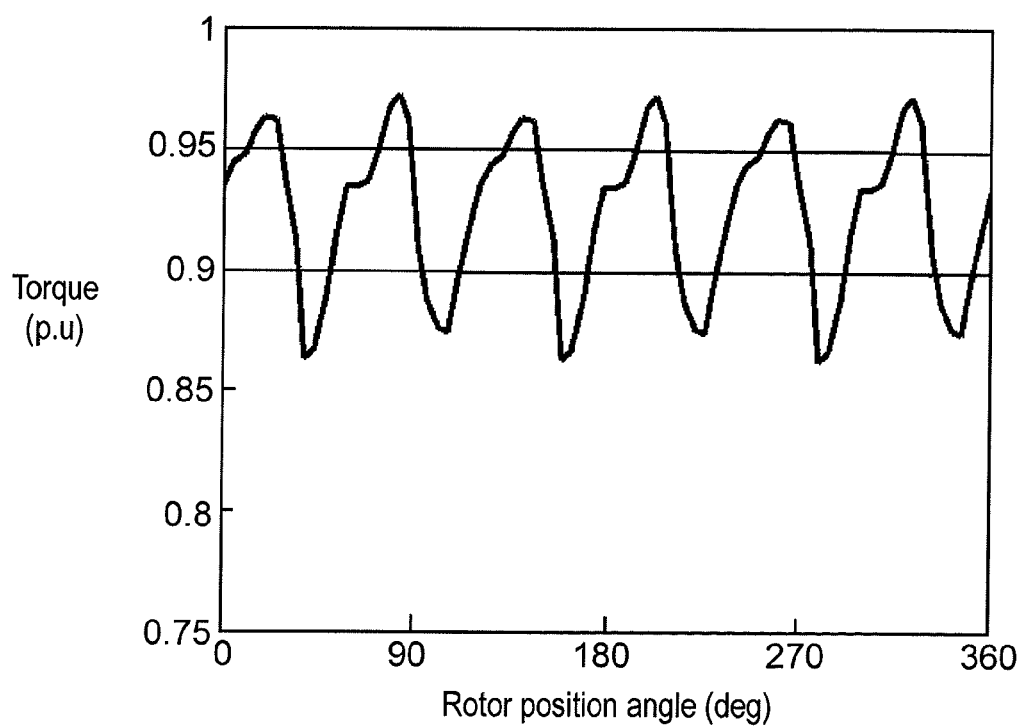
FIG. 12B is a diagram showing the relation of rotor position angle and torque of the electric motor in a prior art.

FIG. 12A and FIG. 12B are diagrams showing the relation of rotor position angle and torque, FIG. 12A showing this preferred embodiment 1 and FIG. 12B showing the prior art. Herein, the torque is a value relating to the cogging torque.

In the electric motor of the prior art, since the fluctuation of the cogging torque is significant, the fluctuation of the torque value is large as shown in FIG. 12B. By contrast, in the electric motor of this preferred embodiment 1, since the fluctuation of the cogging torque is small, the fluctuation of the torque value is also small as shown in FIG. 12A. Hence, as compared with the electric motor of the prior art, the electric motor of this preferred embodiment 1 is smaller in the torque ripple.

Figure 13:
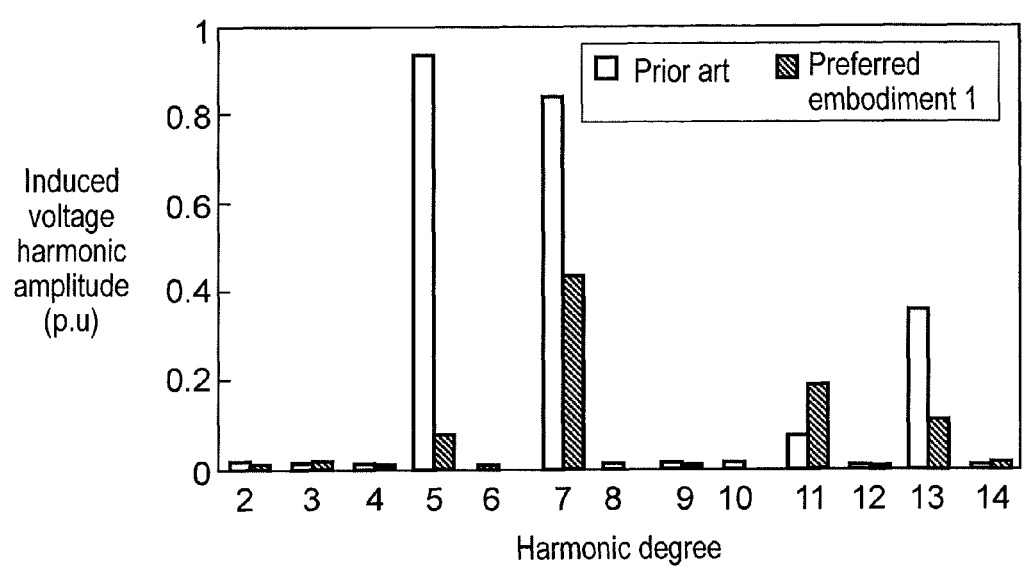
FIG. 13 is a comparative diagram of the relation of induced voltage harmonic amplitude and harmonic degree, between preferred embodiment 1 and a prior art.

FIG. 13 is a comparative diagram of the relation of induced voltage harmonic amplitude and harmonic degree, between this preferred embodiment 1 and the prior art.

In the electric motor of the prior art, since the magnetic flux density distribution is largely deviated from the ideal sinusoidal wave shape, in particular at the fifth, seventh and thirteenth degree, the induced voltage harmonic amplitude is large. By contrast, in the electric motor of this preferred embodiment 1, since the magnetic flux density distribution is less deviated from the ideal sinusoidal wave shape, at almost all degrees, the induced voltage harmonic amplitude is smaller than in the electric motor of the prior art.

As explained herein, in the electric motor of this preferred embodiment 1, in mutually adjacent arcs A1 and A2, radius R1 of arc A1 at the d-axis side is larger than radius R2 of arc A2 at the q-axis side, and at intersection point β of the mutual arcs, angle α of tangent u of arc A2 to tangent t of arc A1 is set in a range of $-3 \text{ degrees} \leq \alpha \leq 2 \text{ degrees}$. Accordingly, in the electric motor of this preferred embodiment 1, near the intersection point of mutually adjacent arcs, the curvature of the outer circumferential curved surface of the rotor core can be changed smoothly, and the magnetic flux density distribution of the air gap part may be approximate to the sinusoidal wave shape. Hence, increase in the torque ripple or induced voltage distortion factor can be suppressed, and a permanent magnet buried type electric motor effective for low vibration and low noise can be presented.

Preferred Embodiment 2

Preferred embodiment 2 of the present invention is explained below while referring to the accompanying drawings. Herein, same constituent elements as in preferred embodiment 1 are identified with same reference numerals, and the duplicate explanation is omitted.

Figure 14:
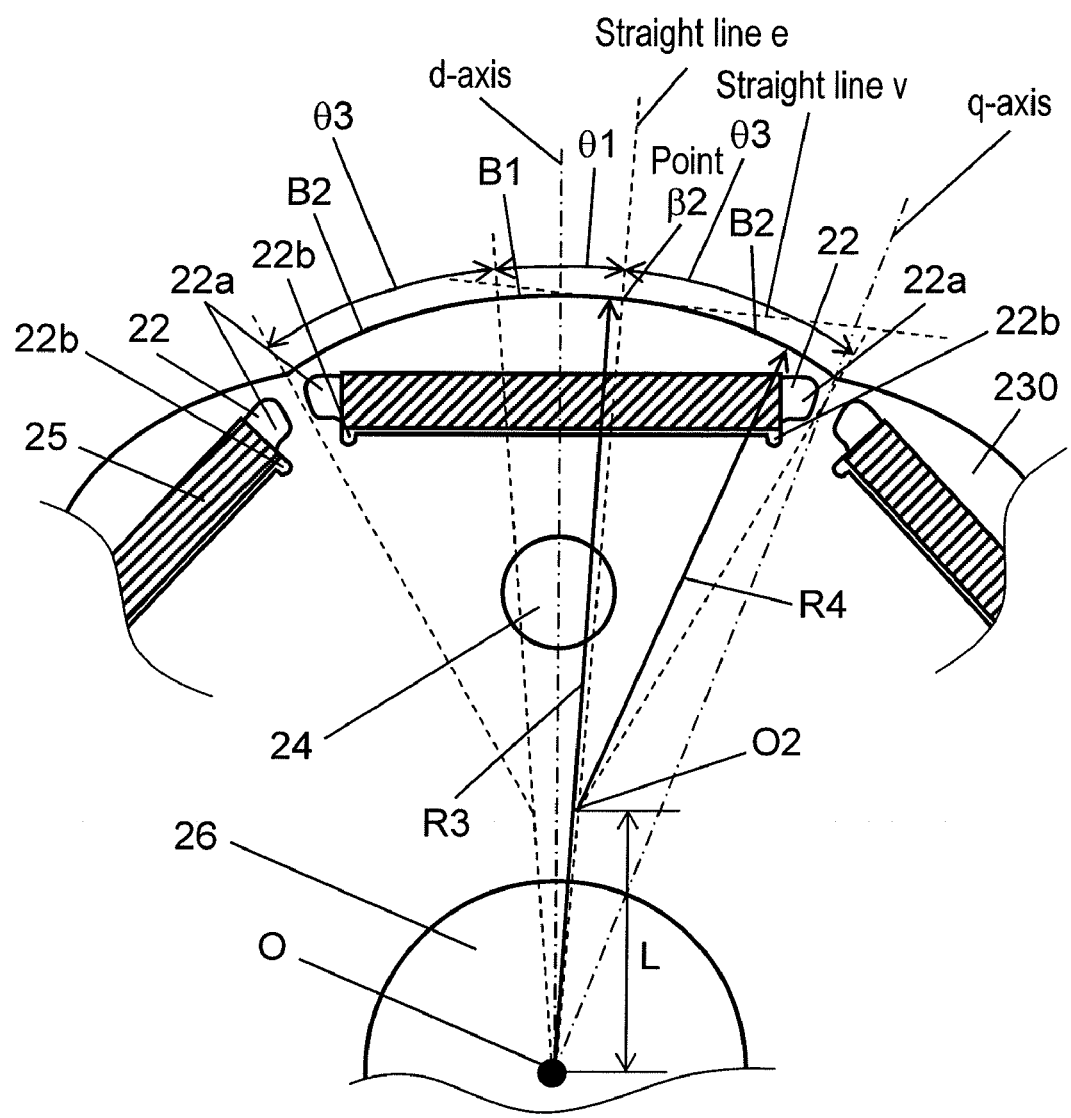
FIG. 14 is a magnified view of the outer circumference corresponding to one magnetic pole in a rotor of a permanent magnet buried type electric motor in preferred embodiment 2 of the present invention.

FIG. 14 is a partially magnified view of the outer circumference corresponding to one magnetic pole in a rotor of a permanent magnet buried type electric motor in preferred embodiment 2 of the present invention.

The outer circumferential shape of rotor core 230 corresponding to one magnetic pole in the rotor of the electric motor of this preferred embodiment 2 is different from that of the rotor of the electric motor of preferred embodiment 1 in that it is composed of two arcs, arc B1 at the d-axis side and arc B2 at the q-axis side, having different radii R3, R4.

Arc B1 positioned at the intersection point of d-axis and outer circumference of rotor core 230 is formed at radius R3 centered on rotation center O. Arc B2 adjacent to arc B1 is formed at radius R4 centered on point O2. In the electric motor of this preferred embodiment 2, the tangent of arc B2 at intersection point β2 of arc B1 and arc B2 is set so that angle α to the tangent of arc B1 at intersection point β2 may be 0 degree. In other words, the tangent of arc B1 and the tangent of arc B2 at intersection point β2 is positioned on same straight line v.

In this preferred embodiment 2, as shown in FIG. 14, center O2 of arc B2 is positioned on a straight line joining rotation center O and intersection point β2. In other words, arc B2 adjacent to arc B1 is formed at radius R4 centered on point O2 on straight line e passing intersection point β2 and center of arc B1 (rotation center O). Center O and center O2 are spaced by length L, and the equation of R1=R2+L is established.

Thus, in arc B1 and arc B2, since intersection point β2, center O and center O2 are formed on same straight line e, the tangent at intersection point β2 are also on same straight line v. Therefore, arc B1 and arc B2 are drawn in smooth curves also before and after the circumferential direction of intersection point β2.

By contrast, in the prior art shown in FIG. 22, as described above, the intersection point of second outer circumferential portion P2 and q-axis, center O of first outer circumferential portion P1, and center Q of second outer circumferential portion P2 are positioned on a same straight line. In other words, first outer circumferential portion P1 and second outer circumferential portion P2 have centers on different straight lines at their intersection point γ, and the tangents of first outer circumferential portion P1 and second outer circumferential portion P2 are not formed on a same straight line at intersection point γ. Hence, from the boundary of intersection point γ, the curvature is changed abruptly. As a result, as shown in FIG. 9, the change of the air gap length of first outer circumferential portion P1 and the change of the air gap length of second outer circumferential portion P2 are changed abruptly from the boundary of intersection point γ part.

On the other hand, in the configuration of the electric motor of this preferred embodiment 2, arc B1 and arc B2 have the centers on same straight line e at their intersection point β2, and the tangents of arc B1 and arc B2 are formed on same straight line v at intersection point β2. Accordingly, before and after the circumferential direction of intersection point β2, the curvature is changed smoothly. As a result, as shown in FIG. 9, the change of the air gap length of arc B1 and the change of the air gap length of arc B2 are changed smoothly before and after intersection point β2 part.

As explained herein, in the electric motor of this preferred embodiment 2, angle α of the tangent of arc B2 at intersection point β2 to the tangent of arc B1 at intersection point β2 is set at 0 degree. In other words, intersection point β2 of the mutually adjacent arcs, center O of arc B1 at the d-axis side, and center O2 of arc B2 at the q-axis side are formed on same straight line e. Therefore, the curvature of arc B1 and arc B2 can be changed smoothly before and after intersection point β2, and the magnetic flux density distribution of the air gap part may be approximate to the sinusoidal wave shape. Hence, in such configuration as known from FIG. 7 and FIG. 8, increase in the torque ripple or induced voltage distortion factor can be suppressed, and a permanent magnet buried type electric motor effective for low vibration and low noise can be presented.

Preferred Embodiment 3

Preferred embodiment 3 of the present invention is explained below while referring to the accompanying drawings. Herein, same constituent elements as in preferred embodiment 1 are identified with same reference numerals, and the duplicate explanation is omitted.

Figure 15:
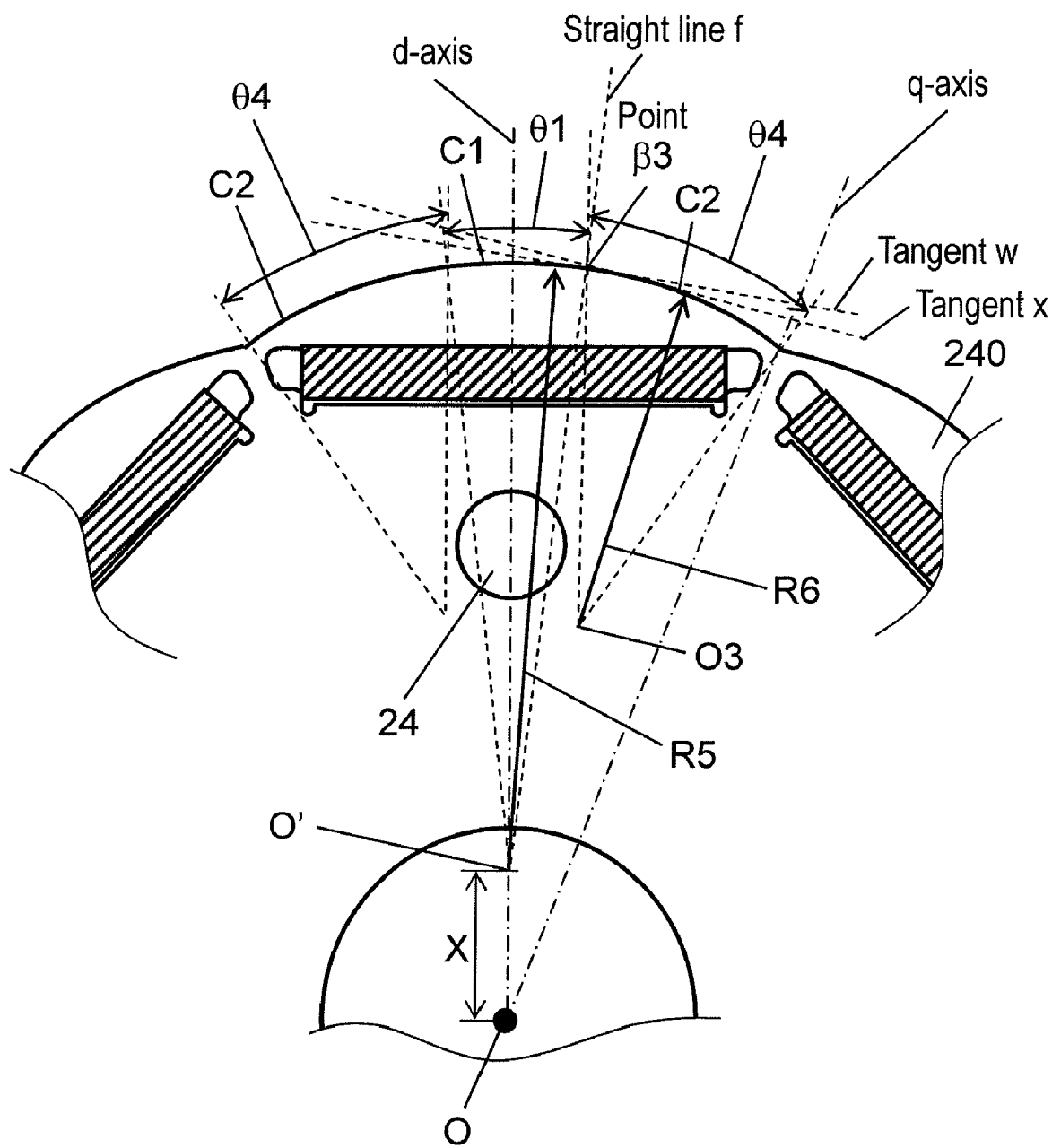
FIG. 15 is a magnified view of the outer circumference corresponding to one magnetic pole in a rotor of a permanent magnet buried type electric motor in preferred embodiment 3 of the present invention.

FIG. 15 is a partially magnified view of the outer circumference corresponding to one magnetic pole in a rotor of a permanent magnet buried type electric motor in preferred embodiment 3 of the present invention.

The outer circumferential shape of rotor core 240 corresponding to one magnetic pole in the rotor of the electric motor of this preferred embodiment 3 is different from that of the rotor of the electric motor of preferred embodiment 1 in that it is composed of two arcs, arc C1 at the d-axis side and arc C2 at the q-axis side, having different radii R5, R6.

Arc C1 positioned at the intersection point of d-axis and outer circumference of rotor core 240 is formed at radius R5 centered on position O' deviated from rotation center O by a specified distance X in the outer circumferential direction. Arc C2 adjacent to arc C1 is formed at radius R6 centered on point O3. Angle α3 [degrees] of tangent x of arc C2 at intersection point β3 of arc C1 and arc C2 to tangent w of arc C1 at intersection point β3 is set at −3 degrees or more to 2 degrees or less.

From such relation of tangent w and tangent x, before and after intersection point β3 in the circumferential direction, arc C1 and arc C2 can be drawn in smooth curves.

Herein, radius R5 and R6 are in a relation of R5>R6. That is, radius R5 of arc C1 at the d-axis side is larger than radius R6 of arc C2 at the q-axis side. In particular, the ratio of radius R5 and radius R6, R6/R5 is preferred to be in a relation of 0.5≦R6/R5≦0.9, that is, 0.5 or more to 0.9 or less.

Arc C1 is formed in a range of angle θ1 [degrees] at mechanical angle at both sides of the d-axis from center O'. Herein, the relation of angle θ1 [degrees] and number of pole pairs P is preferred to be in a relation of 12 degrees/P≦θ1≦90 degrees/P. In this preferred embodiment 3, since the number of pole pairs P is 4, the value of angle θ1 is preferred to be in a relation of 3 degrees≦θ1≦22.5 degrees.

Figure 16:
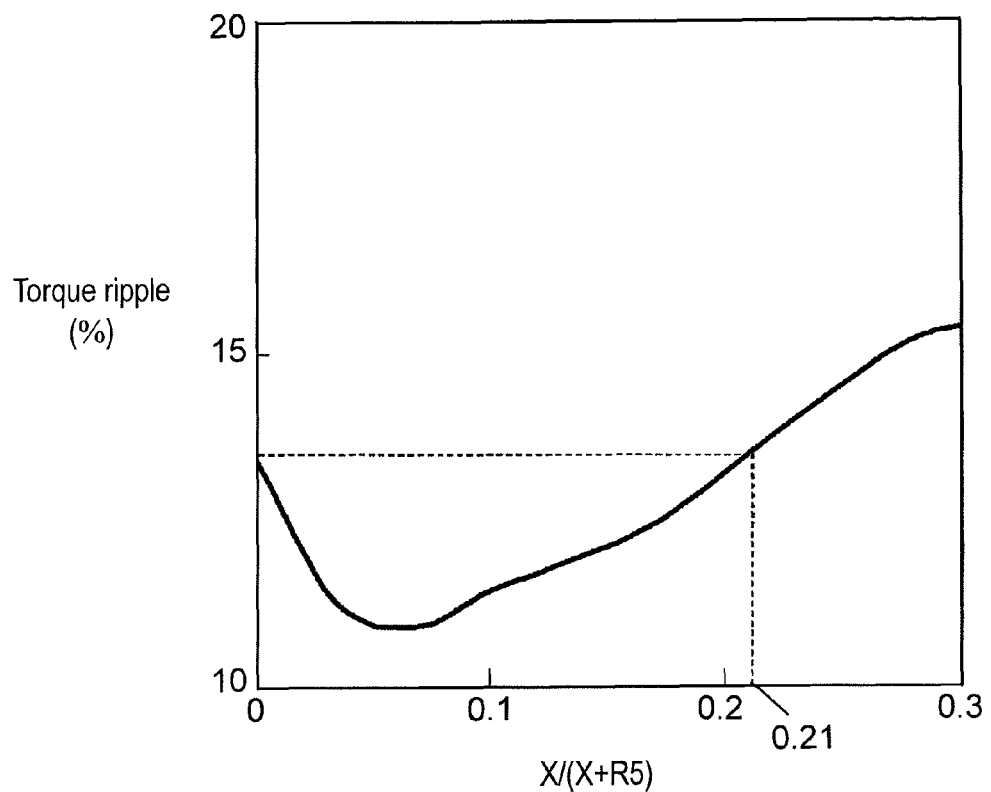
FIG. 16 is a diagram showing the relation of value of X/(X+R5) and torque ripple of the same electric motor.
Figure 17:
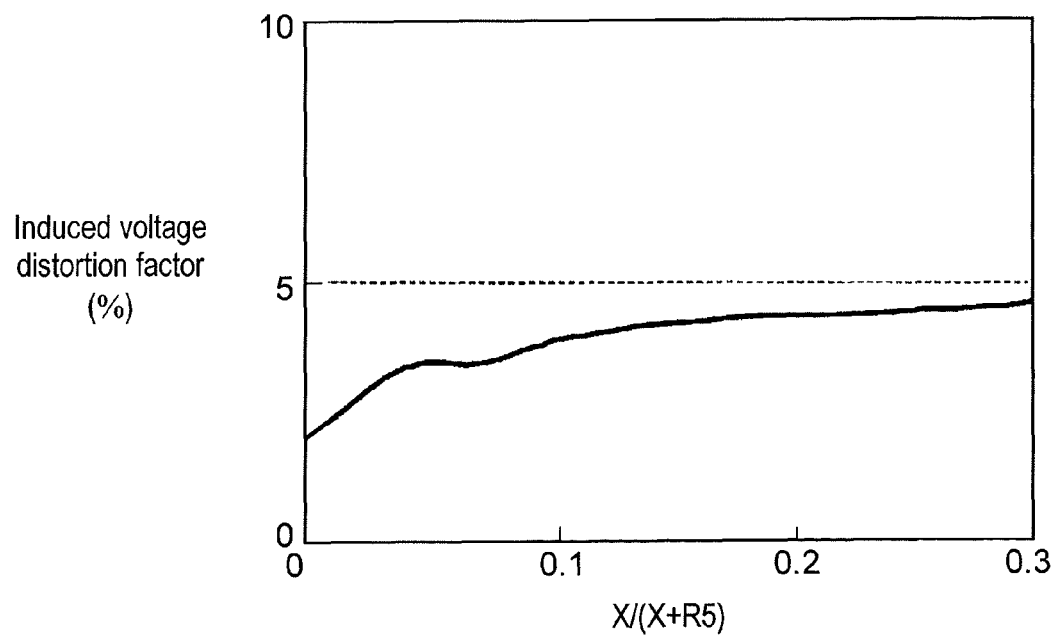
FIG. 17 is a diagram showing the relation of value of X/(X+R5) and induced voltage distortion factor of the same electric motor.

Referring now to FIG. 16 and FIG. 17, the electric motor of present preferred embodiment 3 and the electric motor of preferred embodiment 1 are compared, and their effects are explained.

FIG. 16 is a diagram showing the relation of value of X/(X+R5) and torque ripple of the electric motor of this preferred embodiment 3. The value of X/(X+R5) is the ratio of specified distance X to the sum (X+R5) of radius R5 of arc C1 and specified distance X. In FIG. 16 and FIG. 17, when the value of X/(X+R5) is 0, X is 0, which shows the torque ripple of the electric motor of preferred embodiment 1.

In FIG. 16, supposing the torque ripple when the value of X/(X+R5) is 0 to be standard, when the value of X/(X+R5) is in a range of 0 or more to 0.21 or less, it is lower than the torque ripple of the electric motor of preferred embodiment 1.

FIG. 17 is a diagram showing the relation of value of X/(X+R5) and induced voltage distortion factor of the electric motor of this preferred embodiment 3.

It is known from FIG. 17 that if the value of X/(X+R5) is 0 or more to 0.3 or less, the induced voltage distortion factor is 5% or less, which is effective for low vibration and low noise.

It is hence known that if the value of X/(X+R5) is in a range of 0 or more to 0.21 or less, in particular, the torque ripple is decreased.

Other example of preferred embodiment 3 of the present invention is explained by referring to the drawing.

Figure 18:
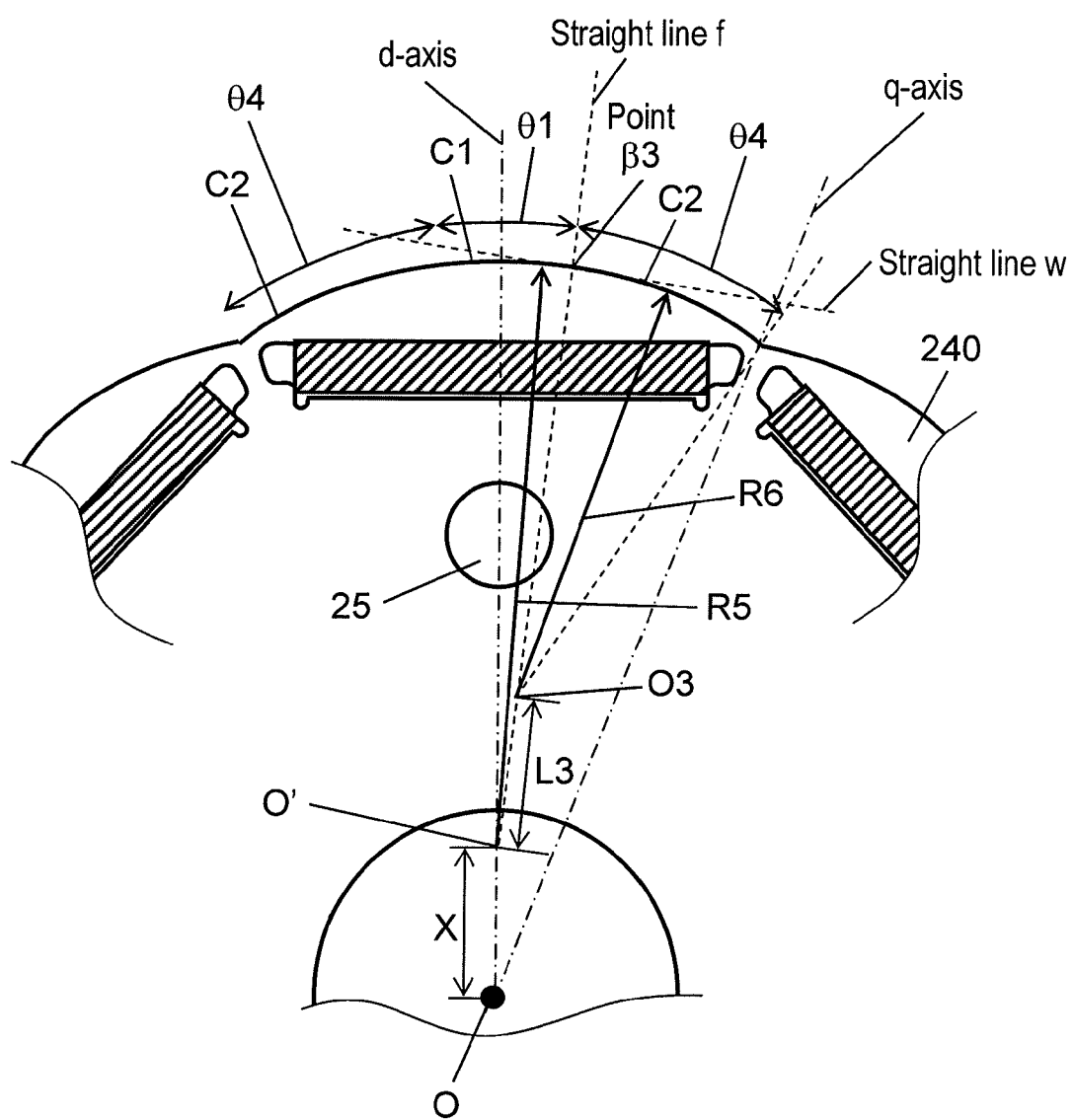
FIG. 18 is a magnified view of the outer circumference corresponding to one magnetic pole in a rotor of a permanent magnet buried type electric motor in other example of preferred embodiment 3 of the present invention.

FIG. 18 is a magnified view of the outer circumference corresponding to one magnetic pole in a rotor of a permanent magnet buried type electric motor in other example of preferred embodiment 3 of the present invention.

As shown in FIG. 18, herein, arc C2 is formed at radius R6, centered on point O3 on straight line f passing through intersection point β3 of arc C1 and arc C2, and center O' of arc C1.

That is, arc C1 positioned at the intersection point of d-axis and outer circumference of rotor core 240 is formed at radius R5 centered on point O' deviated by X from rotation center O in outer circumferential direction. Arc C2 adjacent to arc C1 is formed at radius R6, centered on point O3 on straight line f passing through intersection point β3 of arc C1 and arc C2, and center O' of arc C1. Center O' and center O are spaced by length L3, and the equation of R5=R6+L3 is established.

Thus, since a straight line passing through intersection point β3, center O3, and center O' is formed on same straight line f, arc C1 and arc C2 are formed on same straight line w as the tangent at intersection point β3. As a result, arc C1 and arc C2 are drawn in smooth curves before and after intersection point β3 in the circumferential direction.

Herein, radius R5 and radius R6 are in a relation of R5>R6. Preferably, the relation is $0.5 \leq R6/R5 \leq 0.9$.

Arc C1 is formed in a range of angle θ1 [degrees] at mechanical angle at both sides of d-axis from center O'. Herein, the relation of angle θ1 [degrees] and number of pole pairs P is preferred to be 12 degrees/P$\leq$θ1$\leq$90 degrees/P. In this preferred embodiment 3, since the number of pole pairs P is 4, the relation is preferred to be 3 degrees$\leq$θ1$\leq$22.5 degrees.

As explained in FIG. 16 and FIG. 17, also in the configuration as shown in FIG. 18, the torque ripple can be decreased in particular when the value of X/(X+R5) is in a range of 0 or more to 0.21 or less.

As explained herein, in the electric motor of this preferred embodiment 3, angle α3 [degrees] of tangent x of arc C2 at intersection point β3 to tangent w of arc C1 at intersection point β3 may be set in a range of −3 degrees or more to 2 degrees or less. Arc C1 positioned at the intersection point of d-axis and outer circumference of rotor core is formed so that center O' of this arc is at a position deviated by specified distance X from rotation center O along the d-axis. Accordingly, in the electric motor of this preferred embodiment 3, too, near the intersection point of the mutually adjacent arcs, the curvature of the outer circumferential curved surface of the rotor core can be changed smoothly, and the magnetic flux density distribution of the air gap part may be approximate to the sinusoidal wave shape. Hence, increase in the torque ripple or induced voltage distortion factor can be suppressed, and a permanent magnet buried type electric motor effective for low vibration and low noise can be presented.

Preferred Embodiment 4

Preferred embodiment 4 of the present invention is explained below while referring to the accompanying drawings. Herein, same constituent elements as in preferred embodiment 1 are identified with same reference numerals, and the duplicate explanation is omitted.

Figure 19:
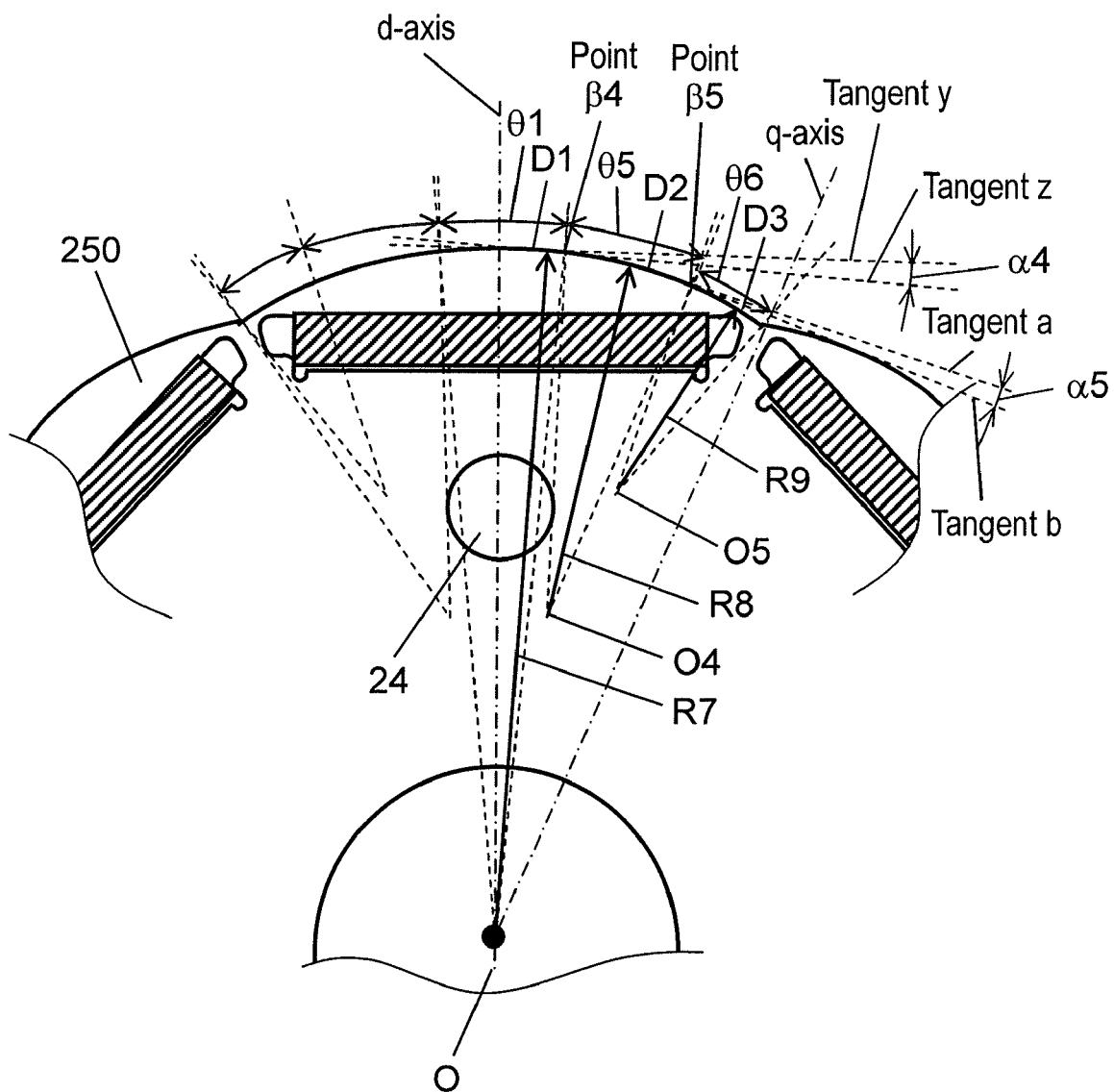
FIG. 19 is a magnified view of the outer circumference corresponding to one magnetic pole in a rotor of a permanent magnet buried type electric motor in preferred embodiment 4 of the present invention.

FIG. 19 is a partially magnified view of the outer circumference corresponding to one magnetic pole in a rotor of a permanent magnet buried type electric motor in preferred embodiment 4 of the present invention.

The outer circumferential shape of rotor core 250 corresponding to one magnetic pole in the rotor of the electric motor of preferred embodiment 4 is different from that of the rotor of the electric motor of preferred embodiment 1 in that it is composed of three arcs, D1, D2, and D3, having different radii R7, R8, and R9. As shown in FIG. 19, arc D1 and arc D2 are mutually adjacent, the arc at the d-axis side being arc D1 and the arc at the q-axis side being arc D2. Similarly, arc D2 and arc D3 are mutually adjacent, the arc at the d-axis side being arc D2 and the arc at the q-axis side being arc D3.

Arc D1 positioned at the intersection point of d-axis and outer circumference of rotor core 250 is formed at radius R7 centered on rotation center O. Arc D2 adjacent to arc D1 is formed at radius R8 centered on point O4. Angle α4 of tangent z of arc D2 at intersection point β4 to tangent y of arc D1 at intersection point β4 of arc D1 and arc D2 is set at −3 degrees or more to 2 degrees or less.

From such relation of tangent y and tangent z, before and after intersection point β4 in the circumferential direction, arc D1 and arc D2 can be drawn in smooth curves.

Herein, radius R7 and radius R8 are defined in a relation of R7>R8. In particular, R8/R7 or the ratio of radius R8 to radius R7 is preferred to be in a relation of $0.5 \leq R8/R7 \leq 0.9$.

Arc D1 is formed in a range of angle θ1 [degrees] at mechanical angle at both sides of the d-axis from rotation center O. Herein, the relation of angle θ1 [degrees] and number of pole pairs P is preferred to be in a relation of 12 degrees/P$\leq$θ1$\leq$90 degrees/P. In this preferred embodiment 4, since the number of pole pairs P is 4, the value of angle θ1 is preferred to be in a relation of 3 degrees$\leq$θ1$\leq$22.5 degrees.

Arc D3 adjacent to arc D2 is formed at radius R9 centered on point O5. Angle α5 of tangent b of arc D3 at intersection point β5 to tangent a of arc D2 at intersection point β5 of arc D2 and arc D3 is set at −3 degrees or more to 2 degrees or less.

From such relation of tangent a and tangent b, before and after intersection point β5 in the circumferential direction, arc D2 and arc D3 can be drawn in smooth curves.

Herein, radius R8 and radius R9 are defined in a relation of R8>R9. In particular, R9/R8 or the ratio of radius R9 to radius R8 is preferred to be in a relation of $0.5 \leq R9/R8 \leq 0.9$.

Other example of preferred embodiment 4 of the present invention is explained by referring to the drawing.

Figure 20:
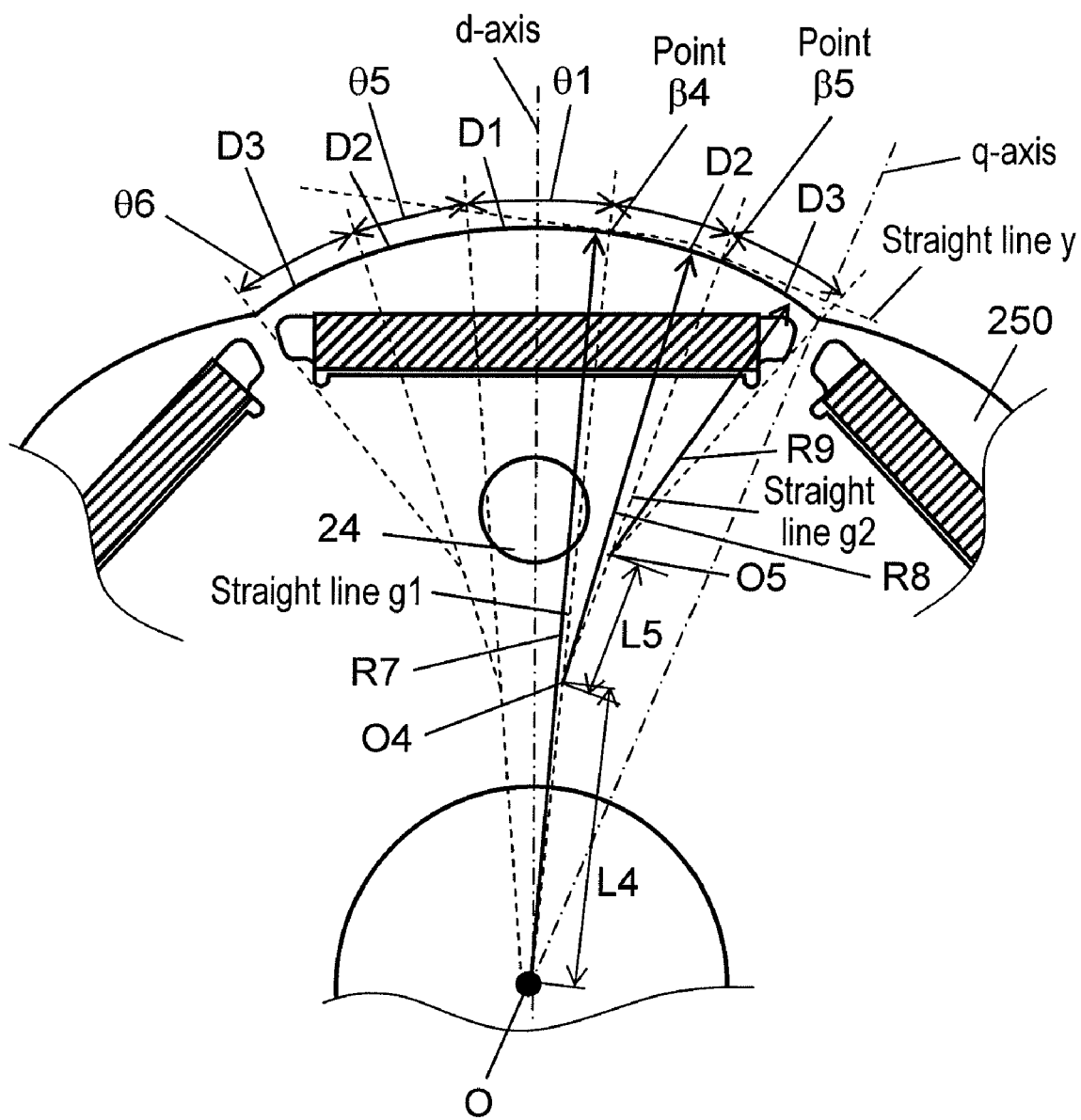
FIG. 20 is a magnified view of the outer circumference corresponding to one magnetic pole in a rotor of a permanent magnet buried type electric motor in other example of preferred embodiment 4 of the present invention.

FIG. 20 is a partially magnified view of the outer circumference corresponding to one magnetic pole in a rotor of a permanent magnet buried type electric motor in other example of preferred embodiment 4 of the present invention.

Herein, as shown in FIG. 20, arc D2 is formed at radius R8, centered on point O4 on straight line g1 passing through intersection point β4 of arc D1 and arc D2 and center O of arc D1. Further, arc D3 is formed at radius R9, centered on point O5 on straight line g2 passing through intersection point β5 of arc D2 and arc D3 and center O4 of arc D2.

That is, arc D1 positioned at the intersection point of d-axis and outer circumference of rotor core 250 is formed at radius R7 centered on rotation center O. Arc D2 adjacent to arc D1 is formed at radius R8 centered on point O4 on straight line g1 passing through intersection point β4 and center of arc D1 (rotation center O). Center O and center O4 are spaced by length L4, and the equation of R7=R8+L4 is established.

Thus, since the straight line passing through intersection point β4, center O4, and center O is on same straight line g1, arc D1 and arc D2 are also on same straight line y together with the tangent at intersection point β4. Hence, before and after intersection point β4 in the circumferential direction, arc D1 and arc D2 are drawn in smooth curves.

Arc D3 adjacent to arc D2 is formed at radius R9 centered on point O5 on straight line g2 passing through intersection point β5 of arc D2 and arc D3 and center O4 of arc D2. Center O4 and center O5 are spaced by length L5, and the equation of R8=R9+L5 is established.

Herein, radius R7, radius R8, and radius R9 are defined in a relation of R7>R8>R9. Preferably, the relation is $0.5 \leq R8/R7 \leq 0.9$. More preferably, the relation is $0.5 \leq R9/R8 \leq 0.9$.

Arc D1 is formed in a range of angle θ1 [degrees] at mechanical angle at both sides of the d-axis from rotation center O. Herein, the relation of angle θ1 [degrees] and number of pole pairs P is preferred to be in a relation of 12 degrees/$P \leq \theta1 \leq 90$ degrees/P. Herein, since the number of pole pairs P is 4, the relation is preferred to be 3 degrees$\leq \theta1 \leq 22.5$ degrees.

As explained herein, in the electric motor of preferred embodiment 4, in mutually adjacent arcs D1 and D2, radius R7 of arc D1 at the d-axis side is larger than radius R8 of arc D2 at the q-axis side, and at intersection point β4 of mutual arcs, angle α of tangent z of arc A2 to tangent y of arc D1 is defined at $-3$ degrees$\leq \alpha \leq 2$ degrees. Further, in mutually adjacent arcs D2 and D3, radius R8 of arc D2 at the d-axis side is larger than radius R9 of arc D3 at the q-axis side, and at intersection point β5 of mutual arcs, angle α of tangent b of arc D3 to tangent a of arc D2 is defined at $-3$ degrees$\leq \alpha \leq 2$ degrees. Thus, in the electric motor of this preferred embodiment 4, there are two or more arcs provided from the d-axis to the q-axis, and at each intersection point, angle α is defined at $-3$ degrees or more to 2 degrees or less. Hence, in the electric motor of this preferred embodiment 1, too, near the intersection point of the mutually adjacent arcs, the curvature of the outer circumferential curved surface of the rotor core can be changed smoothly, and the magnetic flux density distribution of the air gap part may be approximate to the sinusoidal wave shape. Hence, increase in the torque ripple or induced voltage distortion factor can be suppressed, and a permanent magnet buried type electric motor effective for low vibration and low noise can be presented.

In the foregoing preferred embodiments, the outer circumference corresponding to one magnetic pole is formed of two or three arcs having different radii, but as far as the adjacent arcs are formed so that angle α5 of the tangent of the smaller arc at their intersection point, to the tangent of the larger arc at the intersection point may be $-3$ degrees or more to 2 degrees or less, the outer circumference corresponding to one magnetic pole may be formed of four or more arcs having different radii. Similarly, when the straight line passing through the intersection point of the adjacent arcs and the center of the arc is formed on a same straight line, as far as the radius of the arc at the d-axis side out of the mutually adjacent arcs is larger than the radius of the arc at the q-axis side, the outer circumference corresponding to one magnetic pole may be formed of four or more arcs having different radii.

Industrial Applicability

The permanent magnet buried type electric motor of the present invention has an ideal sinusoidal wave shape in magnetic flux density distribution in the air gap part between the stator and the rotor, and is hence very useful as an electric motor having a rotor together with permanent magnets buried in the magnet burying holes in the rotor core.

The invention claimed is:

1. A permanent magnet buried type electric motor comprising:
    a stator having a winding wound on a stator core having a plurality of teeth at the inner circumferential side of a yoke;
    a rotor rotatably held opposite to the teeth; and
    a rotor core, as part of the rotor, having a plurality of magnet burying holes in which permanent magnets are buried for forming magnetic poles, and having an outer circumference composed of a plurality of arcs different in radius,
    wherein, supposing a straight line joining a rotation center of the rotor and a magnetic pole middle, that is, a middle of the permanent magnets to be a d-axis, and a straight line joining the rotation center and an intermediate point of mutually adjacent permanent magnets to be a q-axis, the mutually adjacent arcs are composed such that the radius of the arc at the d-axis side is larger than the radius of the arc at the q-axis side, and that, at an intersection point of the mutual arcs, angle a of a tangent of the arc at the q-axis side with respect to a tangent of the arc at the d-axis side is set by $-3$ degrees $\leq \alpha \leq 2$ degrees; and
    further wherein the magnet burying holes include a rectangular hole, a protrusion, and a recess adjacent to the rectangular hole and protrusion, wherein the recess reduces deviation of the buried permanent magnets in a longitudinal direction within the rectangular hole.

2. The permanent magnet buried type electric motor of claim 1, wherein the arc positioned at an intersection point of the d-axis and the outer circumference of the rotor core is formed so that a center of this arc may be formed on the rotation center.

3. The permanent magnet buried type electric motor of claim 2, wherein angle α is 0 degree.

4. The permanent magnet buried type electric motor of claim 2, wherein the arc positioned at the intersection point of the d-axis and the outer circumference of the rotor core is formed in a range of angle θ1 at mechanical angle to both sides of the d-axis from the rotation center, and
    the relation of angle θ1 and the number of pole pairs P is defined in 12 degrees/P $\leq \theta1 \leq$ 90 degrees/P.

5. The permanent magnet buried type electric motor of claim 1, wherein the arc positioned at the intersection point of the d-axis and the outer circumference of the rotor core is formed so that a center of this arc may be deviated from the rotation center by a specified distance along the d-axis.

6. The permanent magnet buried type electric motor of claim 5, wherein angle α is 0 degree.

7. The permanent magnet buried type electric motor of claim 5, wherein the arc positioned at the intersection point of the d-axis and the outer circumference of the rotor core is formed in a range of angle θ1 at mechanical angle to both sides of the d-axis from the center, and
    the relation of angle θ1 and the number of pole pairs P is defined in 12 degrees/P $\leq \theta1 \leq$ 90 degrees/P.

8. The permanent magnet buried type electric motor of claim 1, wherein the arcs are formed so that the intersection point of the mutually adjacent arcs, the center of the arc at the d-axis side, and the center of the arc at the q-axis side may be formed on a same straight line.

9. The permanent magnet buried type electric motor of claim 8, wherein the arc positioned at the intersection point of the d-axis and the outer circumference of the rotor core is formed so that the center of this arc may be at the rotation center.

10. The permanent magnet buried type electric motor of claim 9, wherein in the mutually adjacent arcs, supposing the ratio of the radius of the arc at the q-axis side to the radius of the arc at the d-axis side to be (radius of arc at q-axis side)/(radius of arc at d-axis side), (radius of arc at q-axis side)/(radius of arc at d-axis side) is in a range of 0.5 or more to 0.9 or less.

11. The permanent magnet buried type electric motor of claim 9, wherein the arc positioned at the intersection point of the d-axis and the outer circumference of the rotor core is formed in a range of angle θ1 at mechanical angle to both sides of the d-axis from the rotation center, and the relation of angle θ1 and the number of pole pairs P is defined in 12 degrees/P ≦θ1 ≦90 degrees/P.

12. The permanent magnet buried type electric motor of claim 8, wherein the arc positioned at the intersection point of the d-axis and the outer circumference of the rotor core is formed so that the center of this arc may be deviated from the rotation center by a specified distance along the d-axis.

13. The permanent magnet buried type electric motor of claim 12, wherein in the mutually adjacent arcs, supposing the ratio of the radius of the arc at the q-axis side to the radius of the arc at the d-axis side to be (radius of arc at q-axis side)/(radius of arc at d-axis side), (radius of arc at q-axis side)/(radius of arc at d-axis side) is in a range of 0.5 or more to 0.9 or less.

14. The permanent magnet buried type electric motor of claim 12, wherein the arc positioned at the intersection point of the d-axis and the outer circumference of the rotor core is formed in a range of angle θ1 at mechanical angle to both sides of the d-axis from the center, and the relation of angle θ1 and the number of pole pairs P is defined in 12 degrees/P ≦θ1 ≦90 degrees/P.

15. The permanent magnet buried type electric motor of claim 12, wherein supposing the radius of the arc positioned at the intersection point of the d-axis and the outer circumference of the rotor core to be Rn, the distance from the rotation center to the center of this arc to be X, and the ratio of X to (X+Rn) to be X/(X+Rn), the value of X/(X+Rn) is 0.21 or less.

16. The permanent magnet buried type electric motor of claim 1, wherein the rotor core is formed by laminating high-permeability thin iron plates having a plurality of the permanent magnet burying holes.

17. The permanent magnet buried type electric motor of claim 1, wherein the stator has a winding wound on the stator core by concentrated winding.

18. A permanent magnet buried type electric motor comprising:

a stator having a winding wound on a stator core having a plurality of teeth at the inner circumferential side of a yoke; and a rotor rotatably held opposite to the teeth, and having a rotor core, the rotor core having a plurality of magnet burying rectangular holes in which permanent magnets are buried for forming magnetic poles, and having an outer circumference composed of a plurality of arcs different in radius;

wherein, supposing a straight line joining a rotation center of the rotor and a magnetic pole middle, that is, a middle of the permanent magnets to be a d-axis, and a straight line joining the rotation center and an intermediate point of mutually adjacent permanent magnets to be a q-axis;

the mutually adjacent arcs are composed such that the radius of the arc at the d-axis side is larger than the radius of the arc at the q-axis side, and that, at an intersection point of the mutual arcs, angle α of a tangent of the arc at the q axis side with respect to a tangent of the arc at the d-axis side is set by −3 degrees ≦60 ≦2 degrees; and the magnet burying rectangular holes are provided with protrusions formed at a side of a rotating shaft in a shorter side direction, near both ends of a longer side direction, wherein a length of the protrusions in a radial direction of the rotor is smaller than a length of the rectangular hole.

19. A permanent magnet buried type electric motor comprising a stator having a winding wound on a stator core having a plurality of teeth at the inner circumferential side of a yoke, and a rotor rotatably held opposite to the teeth, and having a rotor core, the rotor core having a plurality of magnet burying holes in which permanent magnets are buried for forming magnetic poles, and having an outer circumference composed of a plurality of arcs different in radius, wherein, supposing a straight line joining a rotation center of the rotor and a magnetic pole middle, that is, a middle of the permanent magnets to be a d-axis, and a straight line joining the rotation center and an intermediate point of mutually adjacent permanent magnets to be a q-axis, the mutually adjacent arcs are composed such that the radius of the arc at the d-axis side is larger than the radius of the arc at the q-axis side, and that, at an intersection point of the mutual arcs, angle α of a tangent of the arc at the q axis side with respect to a tangent of the arc at the d-axis side is set by −3 degrees ≦α≦2 degrees, and wherein the arc positioned at the intersection point of the d-axis and the outer circumference of the rotor core is formed in a range of angle θ1 at mechanical angle to both sides of the d-axis from the rotation center, and the relation of angle θ1 and the number of pole pairs P is defined in 12 degrees/P ≦θ1 ≦90 degrees/P.

20. The permanent magnet buried type electric motor of claim 19, wherein in the mutually adjacent arcs, a ratio of the radius of the arc at the q-axis side to the radius of the arc at the d-axis side is in a range of 0.7 to 0.8.

* * * * *